(12) United States Patent
Goldfinger

(10) Patent No.: US 8,044,228 B2
(45) Date of Patent: Oct. 25, 2011

(54) LIQUID CRYSTAL COMPOSITIONS

(75) Inventor: Marc B. Goldfinger, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 49 days.

(21) Appl. No.: 12/480,008

(22) Filed: Jun. 8, 2009

(65) Prior Publication Data

US 2010/0308269 A1    Dec. 9, 2010

(51) Int. Cl.
| | |
|---|---|
| C07C 67/10 | (2006.01) |
| C07C 67/14 | (2006.01) |
| C07C 69/76 | (2006.01) |
| C07C 69/86 | (2006.01) |
| C07C 69/94 | (2006.01) |

(52) U.S. Cl. .......... 560/55; 560/56; 560/76; 560/80; 560/82; 560/83; 560/85; 560/100; 560/104; 560/237

(58) Field of Classification Search .......... 252/299.64, 252/299.65, 299.67; 560/55, 56, 76, 80, 560/82, 83, 85, 100, 104, 237
See application file for complete search history.

(56) References Cited

U.S. PATENT DOCUMENTS

| | | | |
|---|---|---|---|
| 4,099,856 | A | 7/1978 | Weissflog et al. |
| 4,637,896 | A | 1/1987 | Shannon |
| 5,506,704 | A | 4/1996 | Broer et al. |
| 5,560,864 | A | 10/1996 | Goulding |
| 5,780,629 | A | 7/1998 | Etzbach et al. |
| 5,793,456 | A | 8/1998 | Broer et al. |
| 5,833,880 | A | 11/1998 | Siemensmeyer et al. |
| 5,885,242 | A | 3/1999 | Arick et al. |
| 5,942,030 | A | 8/1999 | Schuhmacher et al. |
| 6,010,643 | A | 1/2000 | Coates et al. |
| 6,090,308 | A | 7/2000 | Coates et al. |
| 6,120,859 | A | 9/2000 | Buchecker et al. |
| 6,136,225 | A | 10/2000 | Meyer et al. |
| 6,217,792 | B1 | 4/2001 | Parri et al. |
| 6,410,130 | B1 | 6/2002 | Schuhmacher et al. |
| 6,607,677 | B1 | 8/2003 | Buchecker et al. |
| 6,723,395 | B2 | 4/2004 | May et al. |
| 6,887,455 | B2 | 5/2005 | Carpenter et al. |
| 7,622,192 | B2 | 11/2009 | Hayes |
| 2007/0116945 | A1 | 5/2007 | Goldfinger |
| 2007/0152188 | A1 | 7/2007 | Silverman |
| 2007/0154718 | A1 | 7/2007 | Silverman |
| 2007/0228326 | A1 | 10/2007 | Goldfinger et al. |
| 2007/0267599 | A1 | 11/2007 | Goldfinger et al. |
| 2009/0161061 | A1 | 6/2009 | Qi |
| 2010/0079721 | A1 | 4/2010 | Qi |
| 2010/0308265 | A1 | 12/2010 | Goldfinger |
| 2010/0308268 | A1 | 12/2010 | Goldfinger |
| 2010/0308270 | A1 | 12/2010 | Goldfinger |

FOREIGN PATENT DOCUMENTS

| | | |
|---|---|---|
| DE | 3837936 A1 | 5/1990 |
| GB | 1393216 | 5/1973 |
| JP | 6016616 A | 1/1994 |
| JP | 2005097377 A | 4/2005 |
| WO | 2009023759 A2 | 2/2009 |
| WO | 2009023762 A1 | 2/2009 |

OTHER PUBLICATIONS

Baessler et al., Helical Twisting Power of Steroidal Solutes in Cholesteric Mesophases, The Journal of Chemical Physics, vol. 52, No. 2 (1970), pp. 631-637.
Broer et al., In-Situ Photopolymerization of Oriented Liquid-Crystalline Acrlates, 3A), Makromol.Chem., vol. 190 (1989), pp. 2255-2268.
Dehmlow, Trialkoxycyclopropenylium Ions, Angewandte Chemie, International Edition, vol. 13, No. 3 (1974), pp. 209.
Pretsch et al., Spectral Data for Structure Determination of Organic Compounds, Springer-Verlag, Berlin Heidelberg, 2nd Ed. (1989).
Degennis et al., The Physics of Liquid Crystals, Oxford University Press, Oxford, GB (1995).
Palffy-Muhoray, P., The diverse world of liquid crystals,Physics Today, Sep. 2007, pp. 54-59, Kent State University, Ohio.
Broer, Dirk, J., et al., Photo-Induced Diffusion in Polymerizing Chiral-Nematic Media, Advanced Materials Research News, 1999, vol. 11, No. 7, pp. 583-578, Weinheim Germany.
Broer, Dirk, J., et al., In-situ photopolymerization of oriented liquid-crystalline acrylates, 3a), 1989, Makromol Chem. vol. 190, pp. 2255-2268, Groningen, The Netherlands.

*Primary Examiner* — Shean C Wu

(57) ABSTRACT

This invention relates to liquid crystal compositions, and polymer networks and articles comprising the compositions. The compositions comprise at least one compound of the group of compounds represented by the structures of each of the following Formulas (IV), (V) and (VI), as defined herein. A process for making the composition is also provided.

15 Claims, 1 Drawing Sheet

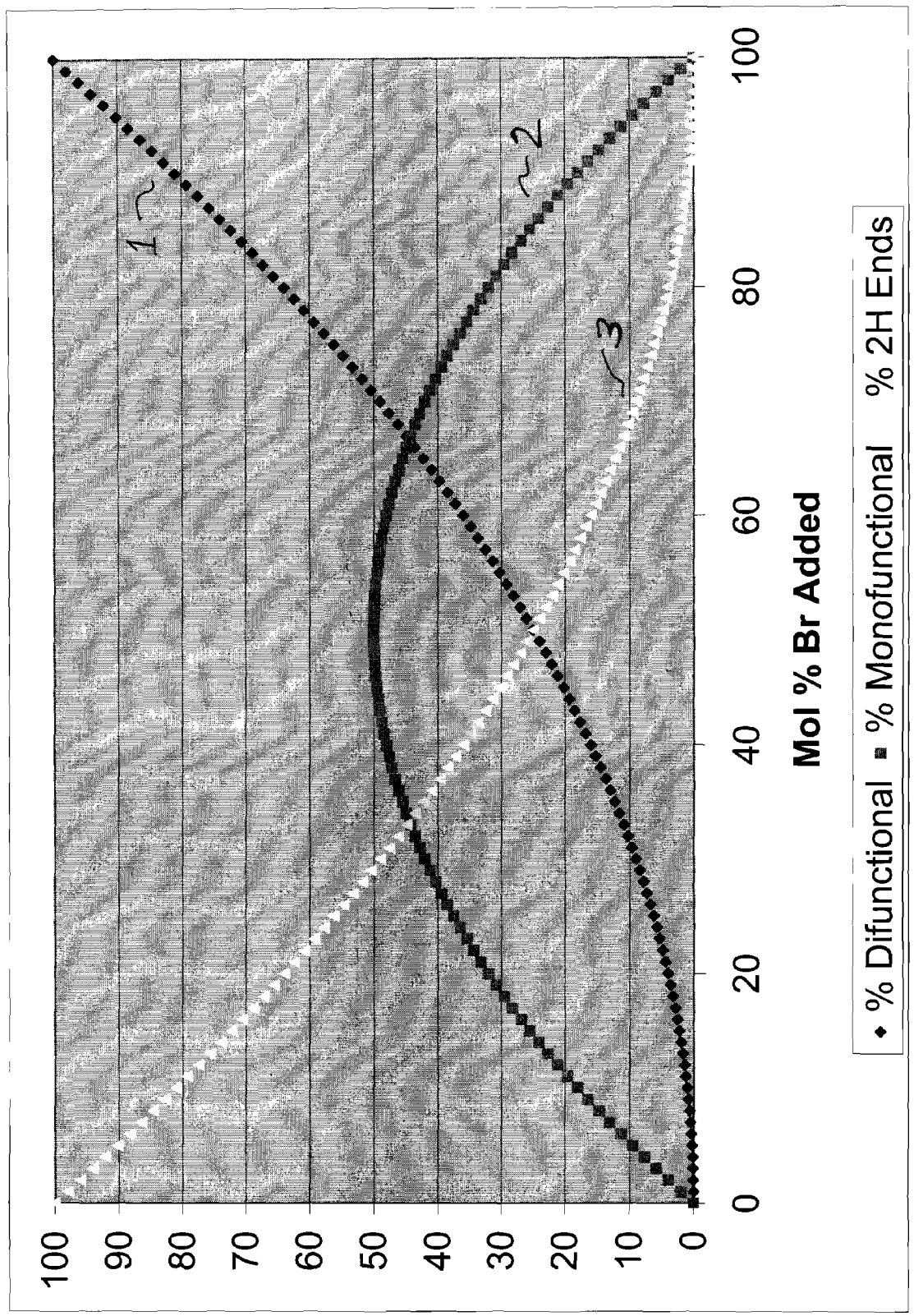

LIQUID CRYSTAL COMPOSITIONS

TECHNICAL FIELD

This invention relates to liquid crystal compositions that contain mixtures of functionalized and non-functionalized compounds, to processes for preparing the liquid crystal compositions, and to articles fabricated from the compositions.

BACKGROUND

Thermotropic liquid crystals are generally crystalline compounds with significant anisotropy in shape. That is, at the molecular level, they are characterized by a rod-like or disc like structure. When heated they typically melt in a stepwise manner, exhibiting one or more thermal transitions from a crystal to a final isotropic phase. The intermediate phases, known as mesophases, can include several types of smectic phases wherein the molecules are generally confined to layers; and a nematic phase wherein the molecules are aligned parallel to one another with no long range positional order. The liquid crystal phase can be achieved in a heating cycle, or can be arrived at in cooling from an isotropic phase. The structure of liquid crystals in general, and twisted nematic liquid crystals in particular, is further discussed in "The Physics of Liquid Crystals", de Gennes and Prost, Oxford University Press, 1995.

An important variant of the nematic phase is one wherein a chiral moiety is present, referred to as a twisted nematic or cholesteric phase. In this case, the molecules are parallel to each other as in the nematic phase, but the director of molecules (the average direction of the rodlike molecules) changes direction through the thickness of a layer to provide a helical packing of the nematic molecules. The pitch of the helix is perpendicular to the long axes of the molecules. This helical packing of anisotropic molecules leads to important and characteristic optical properties of twisted nematic phases including circular dichroism, a high degree of rotary power; and the selective reflection of light, including ultraviolet, visible, and near-IR light. Reflection in the visible region leads to brilliantly colored layers. The sense of the helix can either be right-handed or left-handed, and the rotational sense is an important characteristic of the material. The chiral moiety either may be present in the liquid crystalline molecule itself, for instance, as in a cholesteryl ester, or can be added to the nematic phase as a dopant, with induction of the cholesteric phase. This phenomenon is further discussed in sources such as Bassler and Labes, *J. Chem. Phys.*, 52, 631 (1970).

There has been interest in the preparation of stable polymer layers exhibiting fixed nematic and/or cholesteric optical properties. One approach has been to synthesize monofunctional and/or polyfunctional reactive monomers that exhibit a nematic or cholesteric phase upon melting, formulate a low melting liquid crystal composition, and polymerize the liquid crystal composition in its nematic or cholesteric phase to provide a polymer network exhibiting stable optical properties of the nematic or cholesteric phase. This has resulted in the preparation of compositions comprising mixtures of monofunctional and/or polyfunctional reactive monomers, and U.S. Pat. No. 5,833,880, for example, discloses liquid crystalline mixtures comprising at least two different compounds of the following formula

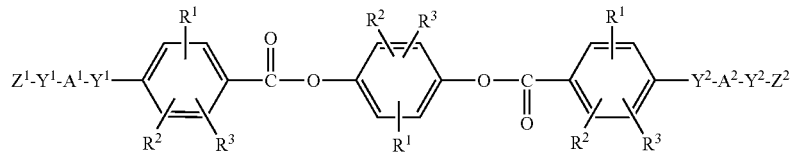

where $Z^1$ and $Z^2$, independently of one another, are polymerizable groups, $Y^1$ and $Y^2$, independently of one another, are each a direct bond, —O—, —COO—, —OCO—, or —S—, $A^1$ and $A^2$, independently of one another, are spacers, and $R^1$, $R^2$, and $R^3$, independently of one another, are as defined in the reference, with the proviso that -$A^1$-$Y^1$— and -$A^2$-$Y^2$—, in at least one of the substances are different O-alkylene radicals.

U.S. Pat. No. 6,090,308 relates to direactive mesogenic compounds or mixtures thereof comprising mesogen-containing molecules, the mesogens having two side chains attached which contain a terminal polymerizable functional group, the mesogens and the functional groups being separated by spacer groups having at least two to twenty spacer atoms, wherein both spacer groups have different chain length.

U.S. Pat. No. 6,136,225 discloses polymerizable liquid crystalline compounds of the Formula $Z^1$—$Y^1$-$A^1$-$Y^3$-M-$Y^4$-$A^2$-$Y^2$—$Z^2$ where $Z^1$ and $Z^2$ are radicals containing reactive groups via which polymerization can be effected, $Y^1$—$Y^4$ are a single chemical bond, oxygen, sulfur, —O—CO—, —CO—O—, —O—CO—O, —CO—NR—, —NR—CO—, —O—CO—NR—, —NR—CO—O— or —NR—CO—NR—, where at least one of the groups $Y^3$ and $Y^4$ is —O—CO—O—, —O—CO—NR—, —NR—CO—O— or —NR—CO—NR—, $A^1$ and $A^2$ are spacers having 2 to 30 carbon atoms in which the carbon chain may be interrupted by ether oxygen, thioether sulfur or by nonadjacent imino or $C_1$-$C_4$-alkylimino groups, M is a mesogenic group, R is $C_1$-$C_4$-alkyl, and compositions comprising them.

US-A-2007/0228326 discloses chemical synthesis of bis (meth)acrylate liquid crystal compounds and polymerization of liquid crystal compositions to provide polymer networks having nematic and cholesteric properties. US-A-2007/0267599 is related to the chemical synthesis of bis(meth) acrylate chiral compounds, liquid crystal compositions comprising the chiral compounds, and polymerization of the liquid crystal compositions to provide polymer networks having cholesteric properties.

A need nevertheless remains for liquid crystal compositions that have broad thermal windows, low melting points and good phase stability against crystallization, and that are easy to prepare and can be tuned to give desired properties.

SUMMARY

One embodiment of the inventions hereof provides a composition that contains at least one compound of the group of compounds represented by the structures of each of the following Formulas (IV), (V) and (VI),

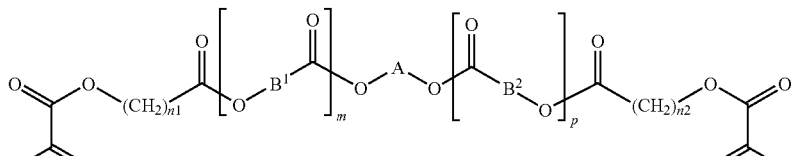

(IV)

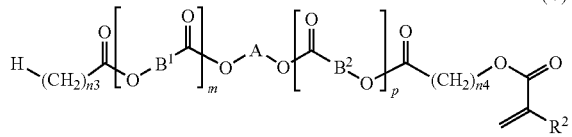

(V)

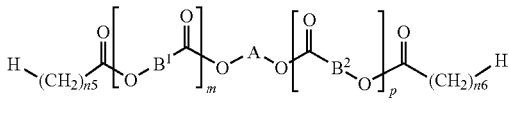

(VI)

wherein
n1, n2, n3, n4, n5, and n6 are each independently integers 3 to 20;
m and p are each independently integers 0, 1, or 2;
A is a divalent radical selected from the group:

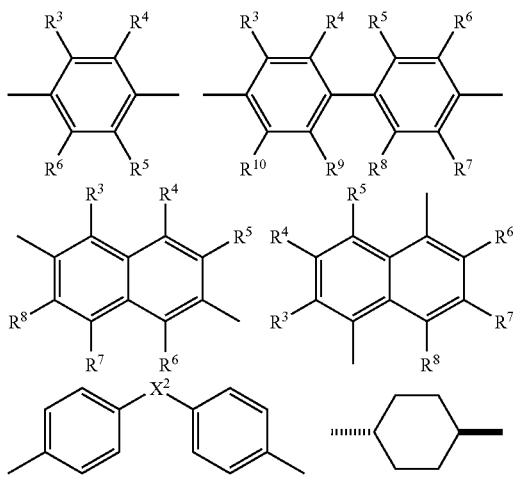

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)CH$_3$, CN, and CF$_3$; $X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl. Another embodiment of the invention is a liquid crystal composition comprising at least one compound of each of the Formulas (IV), (V), and (VI), and in a further embodiment the liquid crystal composition comprises at least one chiral compound.

Another embodiment of the invention is a polymer network derived from the polymerization of the liquid crystal composition comprising at least one compound of each of the Formulas (IV), (V), and (VI), and in a further embodiment the polymer network is derived from polymerization of the liquid crystal composition including at least one chiral compound.

Another embodiment of the invention is an article comprising the liquid crystal composition, and in a further embodiment the article is fabricated as an optical element. Another embodiment of the invention is an article comprising the polymer network derived from the polymerization of the liquid crystal composition, and in a further embodiment the article is fabricated as an optical element.

Another embodiment of the invention is a process for preparing a comprising:
(a) providing one or more organic polyol(s) comprising at least two hydroxyl groups and at least two covalently bonded carbon atoms, each hydroxyl group being bonded to a different carbon atom within an organic polyol;
(b) reacting the organic polyol(s), optionally in the presence of a base, with (i) one or more functionalized alkyl acid(s) or acid halide(s) represented by the structure of the following Formula (X):

$$Z—(CH_2)_n—C(O)X \qquad (X)$$

wherein X is Cl, Br, I, or OH; Z is Br, I, —OTs, —OTf, or —OMs; and n is an integer equal to 3 to 20; and
(ii) one or more non-functionalized alkyl acid(s) or acid halide(s) represented by the structure of the following Formula (XI):

$$Y—(CH_2)_t—C(O)X \qquad (XI)$$

wherein X is Cl, Br, I, or OH; Y is H; and t is an integer equal to 3 to 20; in a first reaction solvent at a first reaction temperature to provide a mixture comprising an intermediate composition and a first spent reaction mixture, the intermediate composition comprising at least one compound of the group of compounds represented by the structures of each of the following Formulas (I), (II) and (III),

(I)

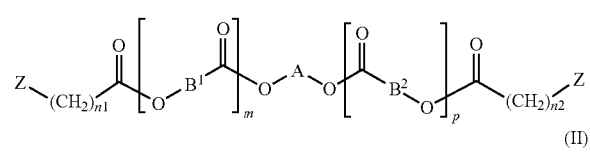

(II)

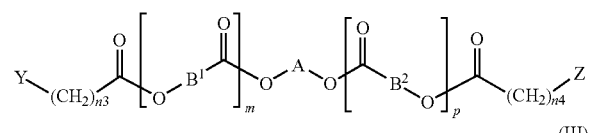

(III)

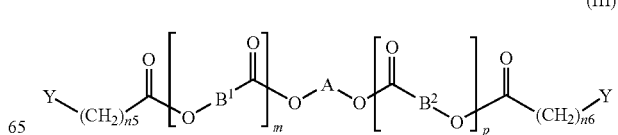

wherein n1, n2, n3, n4, n5, n6, A, $B^1$, $B^2$, m, and p are defined as above; and (c) reacting the intermediate composition with a (meth) acrylate salt in the presence of a phase transfer catalyst and a second reaction solvent at a second reaction temperature to provide a product mixture comprising a composition and a second spent reaction mixture.

In another embodiment, the invention provides a composition as prepared by the process disclosed above; and in another embodiment, the composition prepared by the process disclosed above comprises at least one compound of each of the Formulas (IV), (V), and (VI).

The compositions as described herein have a variety of uses in polymerizable liquid crystal compositions. Choices may be made from within and among the prescribed ranges for the variable radicals and substituents such that each compound of the compositions is, for example, either symmetric or asymmetric.

BRIEF DESCRIPTION OF THE DRAWINGS

FIG. 1 shows a chart of the relative percentage of Formula (IV), (V) and (VI) compounds produced in one embodiment of the invention.

DETAILED DESCRIPTION

One embodiment of the inventions hereof provides a composition comprising at least one compound as represented by the structure of each of the following Formulas (IV), (V), and (VI),

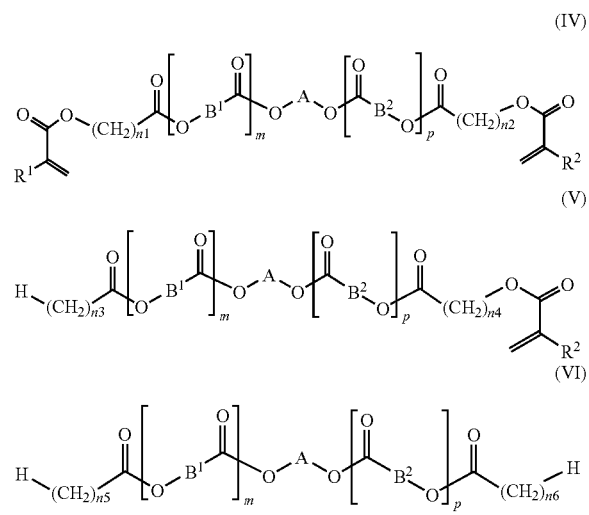

wherein n1, n2, n3, n4, n5, and n6 are each independently integers 3 to 20; m and p are each independently integers 0, 1, or 2; and A is a divalent radical selected from the group:

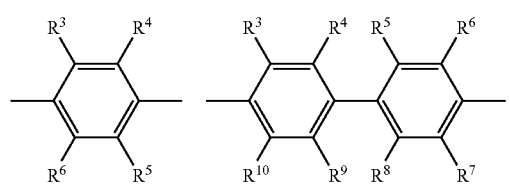

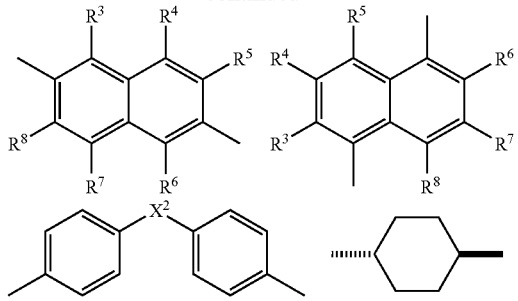

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)$CH_3$, CN, and $CF_3$; $X^2$ is a divalent radical selected from the group: —O—, —$(CH_3)_2$C—, and —$(CF_3)_2$C—; and each $B^1$ and $B^2$ is a divalent radical independently selected from the group: $R^{11}$-substituted-1,4-phenyl, wherein $R^{11}$ is H, —$CH_3$ or —$OCH_3$; 2,6-naphthyl; and 4,4'-biphenyl; with the proviso that when m+p is equal to 3 or 4, at least two of $B^1$ and $B^2$ are $R^{11}$-substituted-1,4-phenyl.

In the phrase "each $B^1$ and $B^2$ is a divalent radical independently selected from the group . . . ", when m=2, the two $B^1$ units are each selected independently, that is they may be the same or different; and when p=2, the two $B^2$ units are each selected independently, that is they may be the same or different. In addition, a $C_1$-$C_8$ group may be any one or more of $C_1$, $C_2$, $C_3$, $C_4$, $C_5$, $C_6$, $C_7$ or $C_8$. Throughout the specification, in Formulas (I), (II), (III), (IV), (V), and (VI), when -A- is a trans-cyclohexyl moiety and one or both of m and p is an integer equal to 0, the term "aryl alkanoate ester(s)" can refer to cyclohexyl alkanoate ester(s).

For each compound of Formula (IV) in the composition, $R^1$ and $R^2$ may be independently selected from H and $CH_3$, and more preferably, $R^1$ and $R^2$ are H. For each compound of Formula (V) in the composition, $R^2$ may be selected from H and $CH_3$, and more preferably, H. For each compound in the composition, n1, n2, n3, n4, n5, and n6 may each independently be integers 3 to 10. For each compound in the composition, when m and p=2, $B^1$ and $B^2$ may each independently be $R^{11}$-substituted-1,4-phenyl.

In another embodiment, for at least one compound of each of the Formulas IV, V and VI of the composition, m is 0 and p is 0. In another embodiment, for at least one compound of each of the Formulas IV, V and VI of the composition, m is 1 and p is 0. In another embodiment, for at least one compound of each of the Formulas IV, V and VI of the composition, m is 1 and p is 1. In another embodiment, for at least one compound of each of the Formulas IV, V and VI of the composition, m is 1 and p is 0; and for at least one compound of each of the Formulas IV, V and VI of the composition m is 1 and p is 1. In another embodiment, n1, n2, and n4 are the same. In another embodiment, the composition comprises only one compound of Formula (IV). In another embodiment, the composition comprises only one compound of Formula (IV), and n1, n2, and n4 are the same.

Another embodiment of the invention provides a composition comprising at least one compound of each of the Formulas (IV), (V), and (VI), wherein for at least one compound of each of the Formulas (IV), (V), and (VI) m is 0 and p is 0, and the Formula (IV) compound is selected from the group of compounds represented by the structures of the following Formulas (VIIa-VIIf):

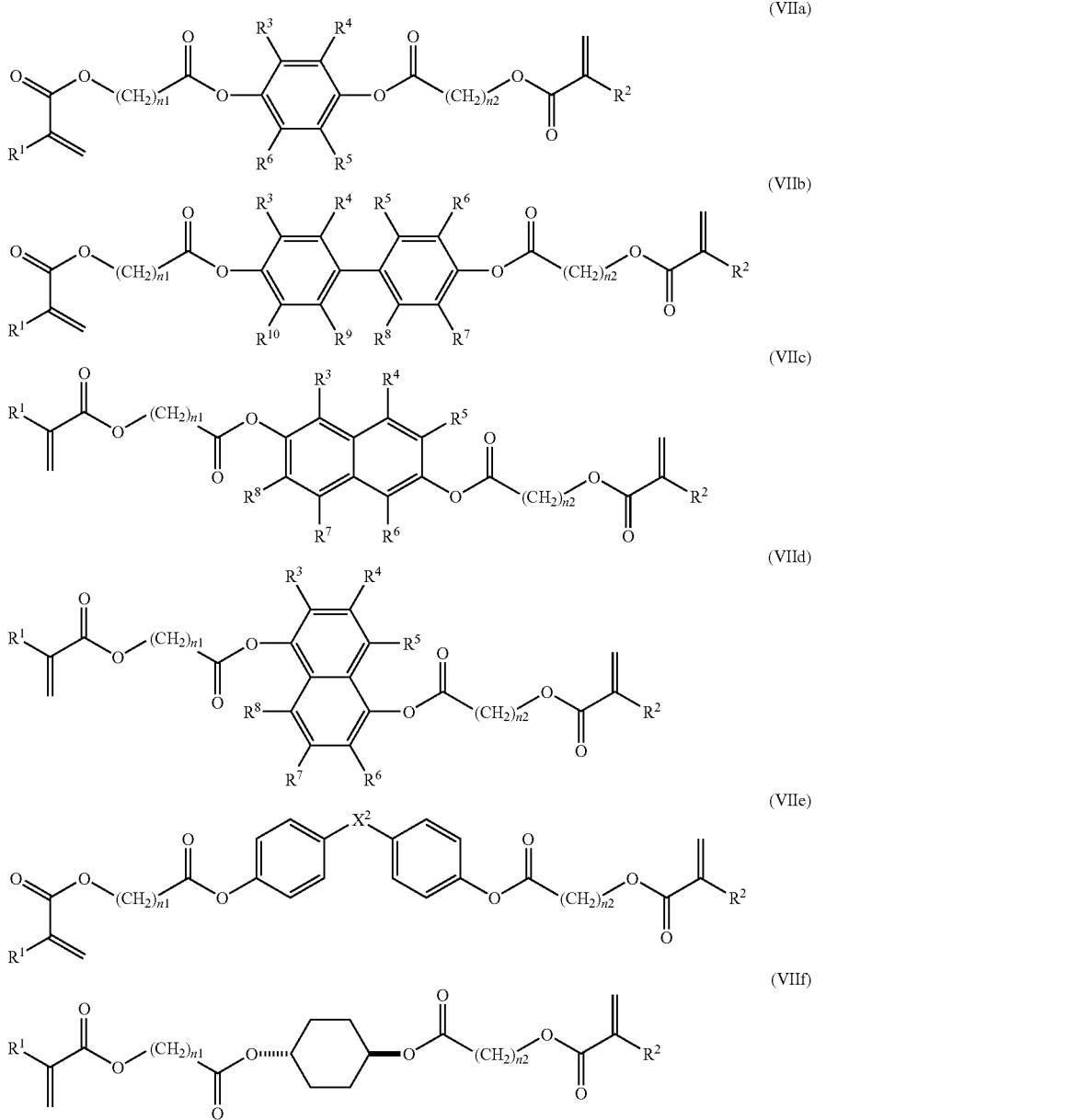
In this embodiment, the Formula (V) compound is selected from the group of compounds as represented by the structures of the following Formulas (XVIIIa-XVIIIf):
-continued
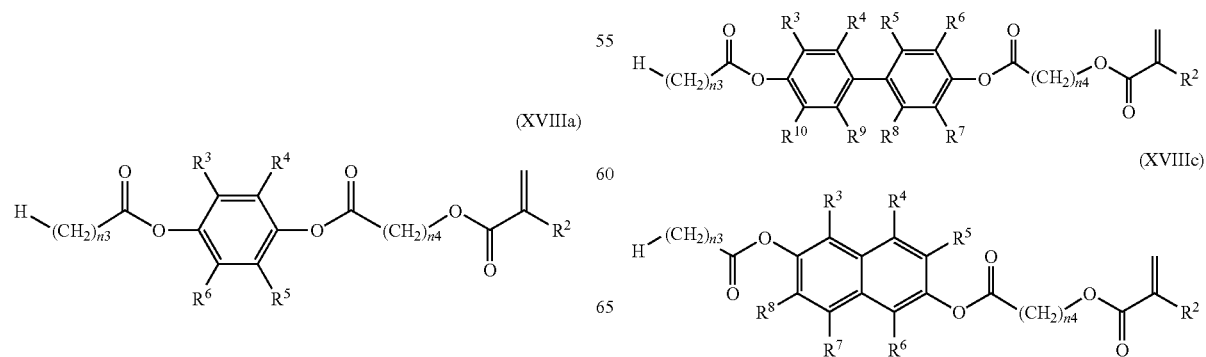

(XVIIId)

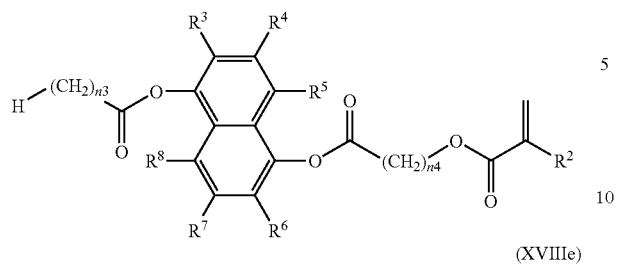

(XVIIIe)

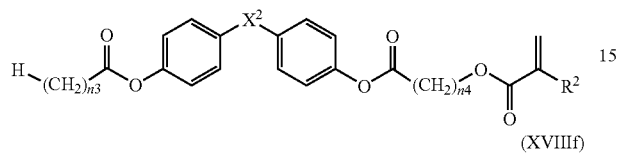

(XVIIIf)

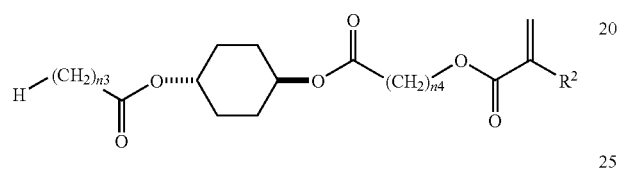

and the Formula (VI) compound is selected from the group of compounds as represented by the structures of the following Formulas (XIXa-XIXf):

(XIXa)

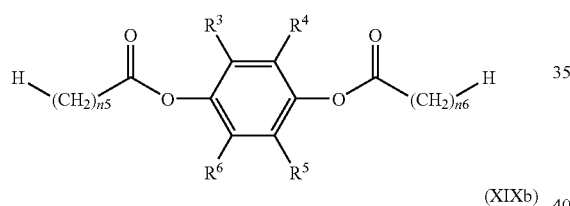

(XIXb)

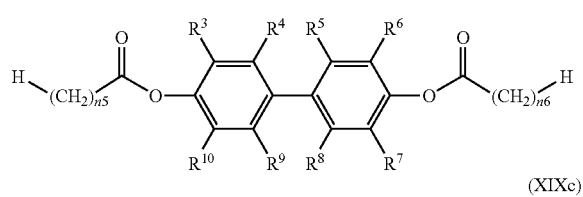

(XIXc)

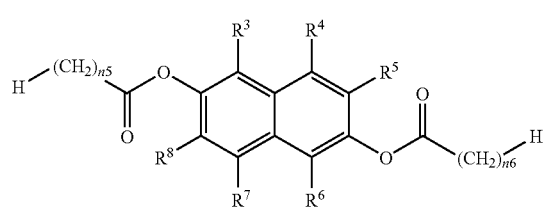

(XIXd)

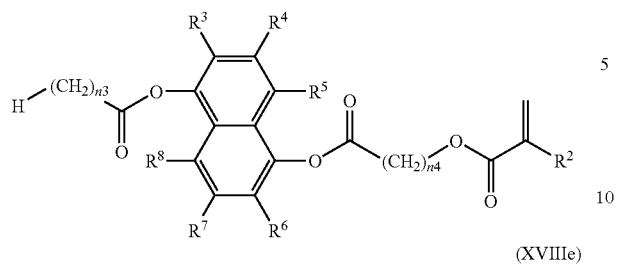

(XIXe)

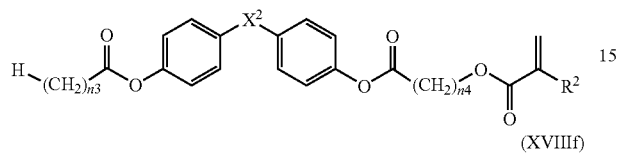

(XIXf)

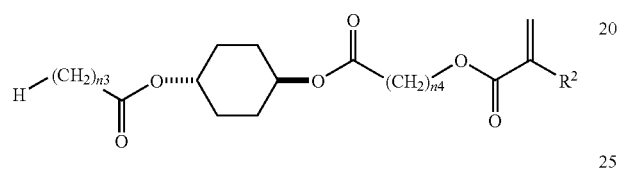

Compositions comprising at least one compound of each of the Formulas (VIIa-VIIf), (VIIIa-VIIIf), and (XIXa-XIXf) are useful as polymerizable diluents and viscosity modifiers for liquid crystal compositions. The synthesis of these compositions is described below. Preferred compositions comprise at least one compound as described in Formulas (VIIa-VIId) wherein $R^3$-$R^8$ are H; at least one compound as described in Formula (VIIa) wherein $R^3$-$R^5$ are H and $R^6$ is $CH_3$; and at least one compound as described in Formula (VIIe) wherein $X^2$ is —$C(CH_3)_2$— or —O—.

Another embodiment of the invention hereof provides a composition comprising at least one compound of each of the Formulas (IV), (V), and (VI), wherein for at least one compound of each of the Formulas (IV), (V), and (VI), m is 1 and p is 0, and a Formula (IV) compound is selected from the group of compounds as represented by the structures of the following Formulas (VIIIa-VIIIe):

(VIIIa)

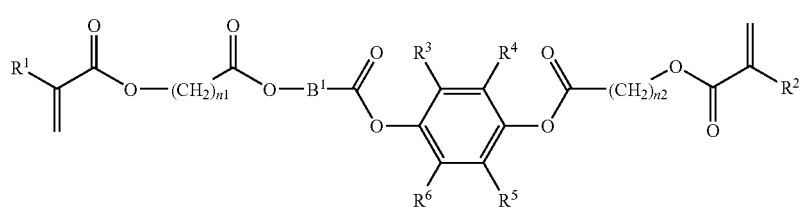

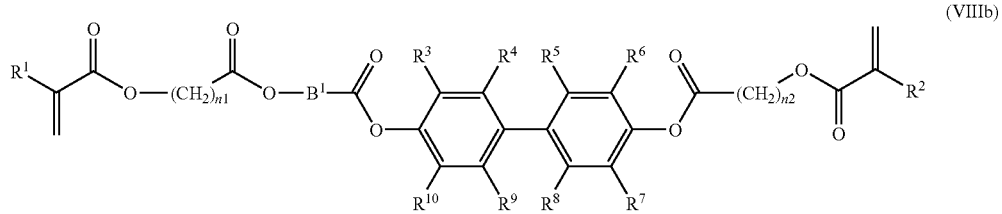
(VIIIb)
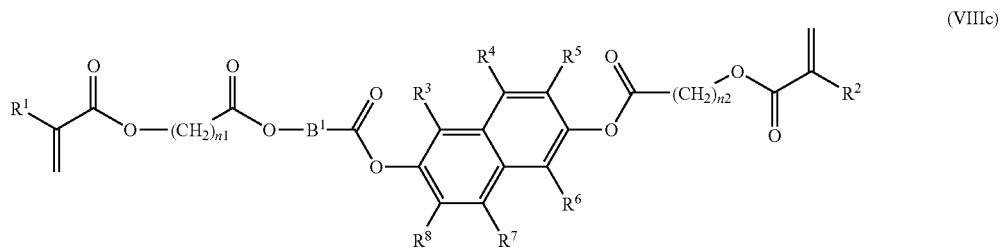
(VIIIc)
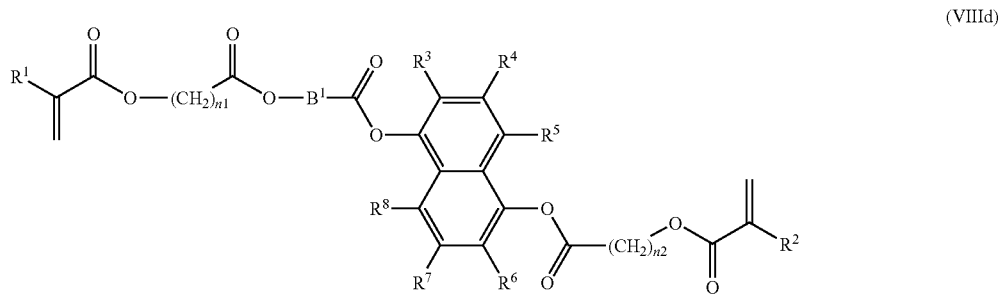
(VIIId)
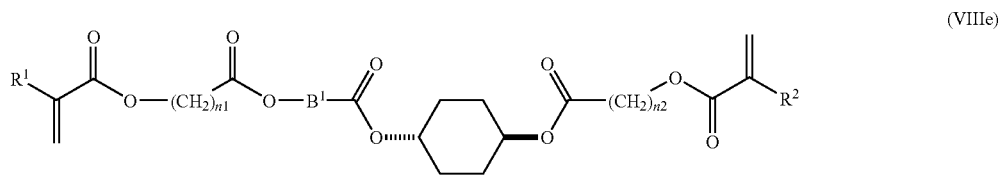
(VIIIe)
In this embodiment, a Formula (V) compound is selected from the group of compounds as represented by the structures of the following Formulas (XXa-XXe):
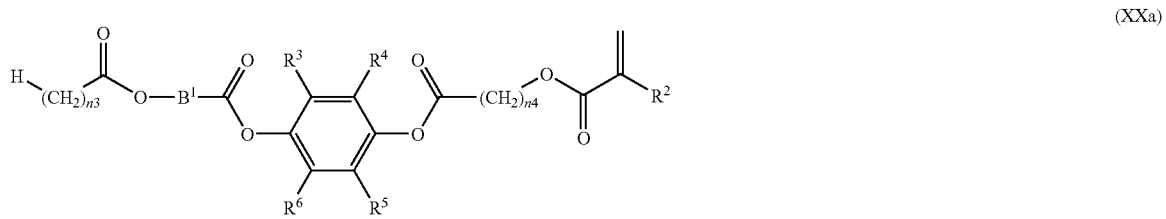
(XXa)
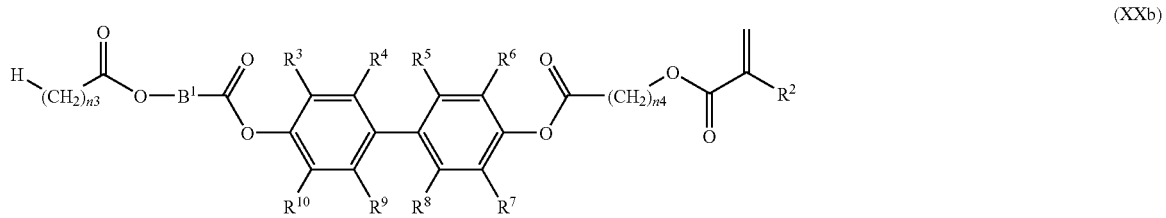
(XXb)

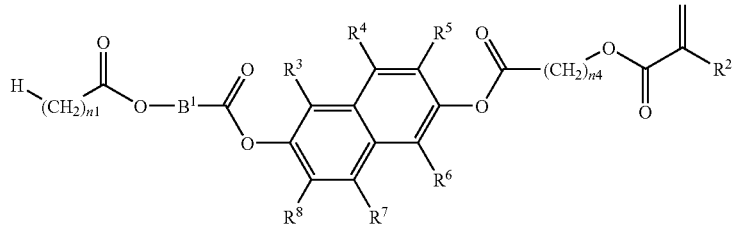
(XXc)

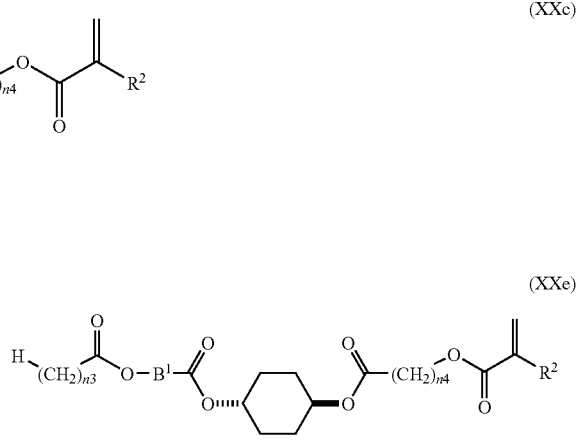
(XXe)

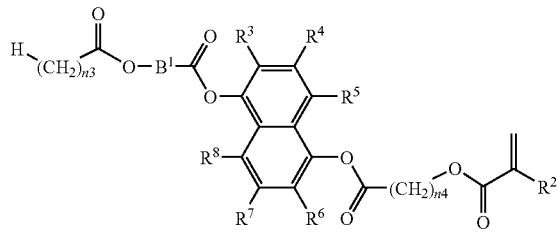
(XXd)

and a Formula (VI) compound is selected from the group of compounds as represented by the structures of the following Formulas (XXIa-XXIe):

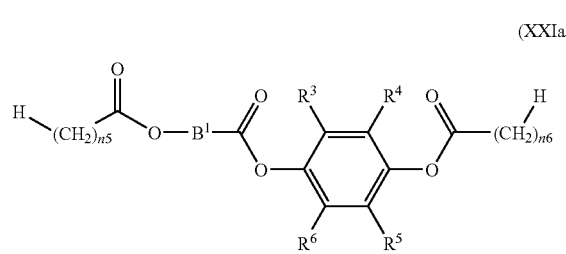
(XXIa)

-continued
(XXIe)

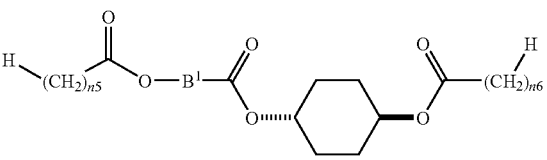

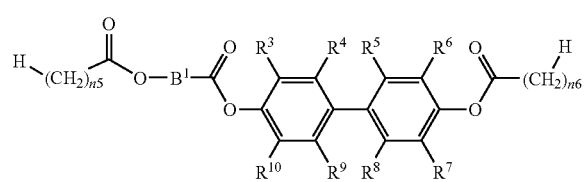
(XXIb)

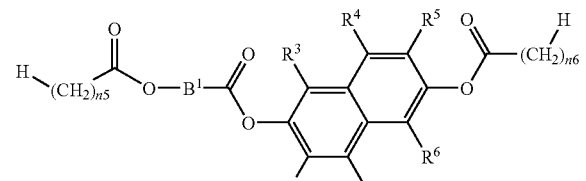
(XXIc)

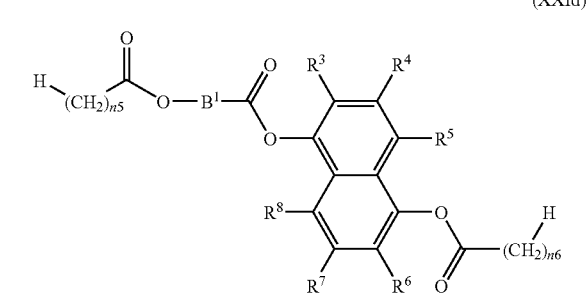
(XXId)

Compositions comprising at least one compound of each of the Formulas (VIIIa-VIIIe), (XXa-XXe), and (XXIa-XXIe) are useful in polymerizable liquid crystal compositions. Such compositions, when comprising at least one compound as described in Formula (VIIIa-VIIIe), exhibit nematic phases at or near room temperature (RT, about 25° C.). Other liquid crystal monomers can be added to the composition to provide nematic phases over broad temperature ranges. Other compositions, when comprising at least one compound within this group, may exhibit low melting points and can be used as reactive diluents and viscosity modifiers in liquid crystal mixtures. Preferred compositions comprise at least one compound as described in Formula (VIIIa) wherein $R^1$-$R^6$ is H. Other preferred compositions comprise at least one compound as described in Formula (VIIIa) wherein $R^1$ and $R^2$ are H; one of the groups $R^3$-$R^6$ is $CH_3$; and three of the group $R^3$-$R^6$ are H. The synthesis of these compositions is described below. Especially preferred compositions are those comprising at least one compound as described in Formula (VIIIa) wherein $R^3$-$R^6$ are H and $R^1$ and $R^2$ are H.

Another embodiment of the inventions hereof provides a composition comprising at least one compound of each of the Formulas (IV), (V), and (VI), wherein for at least one compound of each of the Formulas (IV), (V), and (VI), m is 1 and p is 1, and a Formula (IV) compound is selected from the group of compounds as represented by the structures of the following Formulas (IXa-IXe):

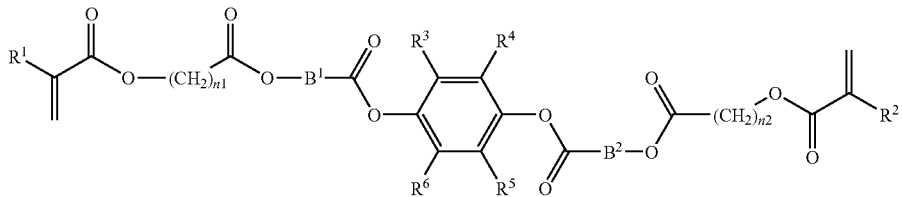
(IXa)
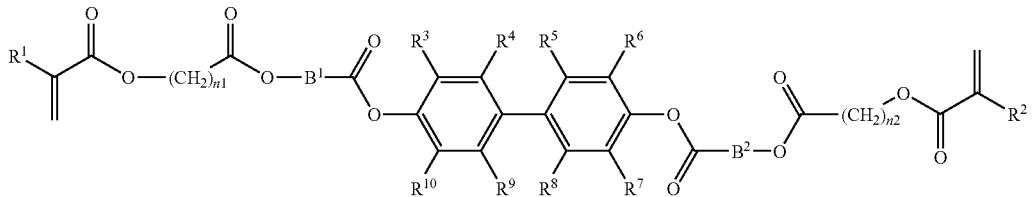
(IXb)
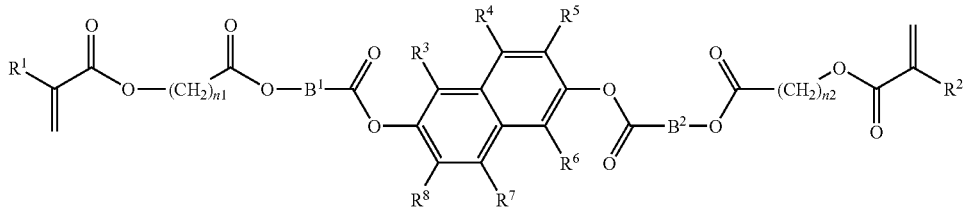
(IXc)
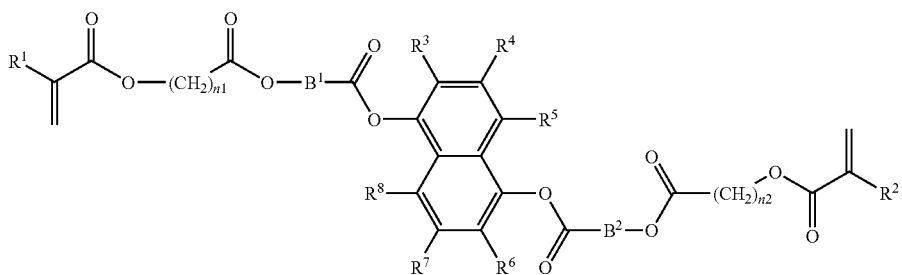
(IXd)
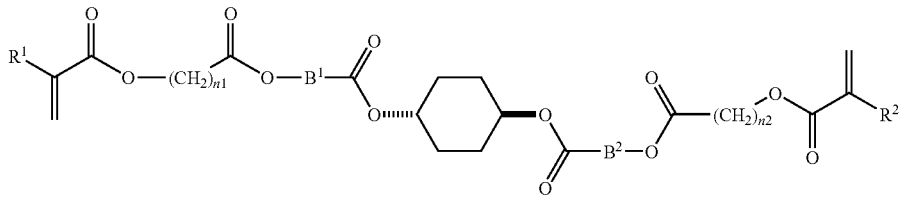
(IXe)
In this embodiment, a Formula (V) compound is selected from the group of compounds as represented by the structures of the following Formulas (XXIIa-XXIIe):
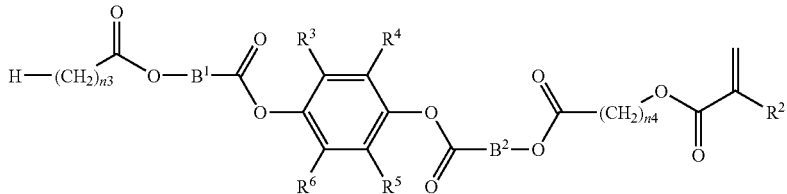
(XXIIa)

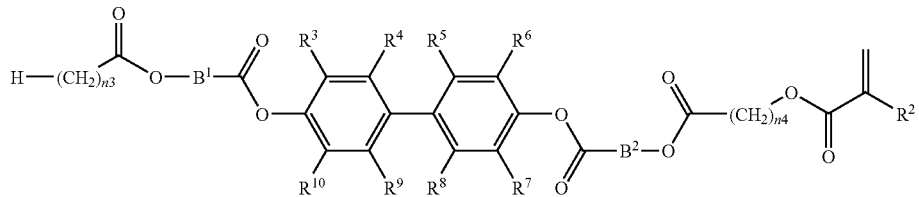
(XXIIb)
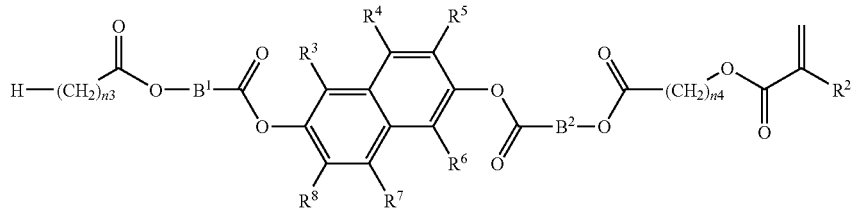
(XXIIc)
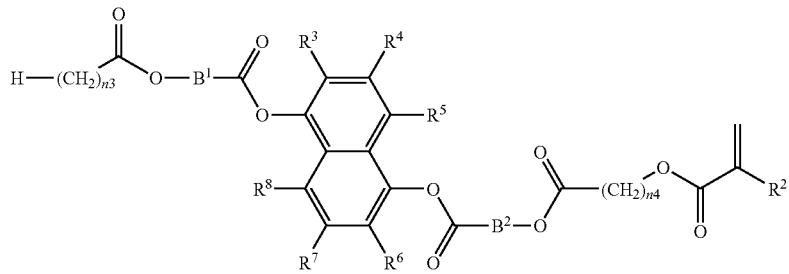
(XXIId)
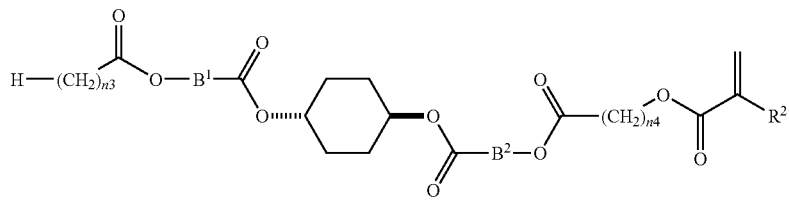
(XXIIe)
and a Formula (VI) compound is selected from the group of compounds as represented by the structures of the following Formulas (XXIIIa-XXIIIe):
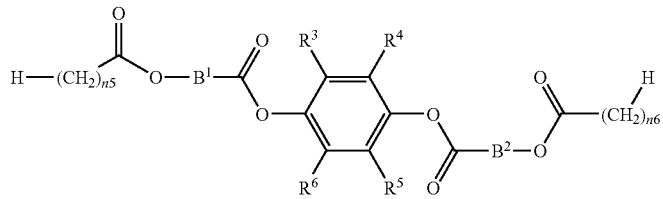
(XXIIIa)
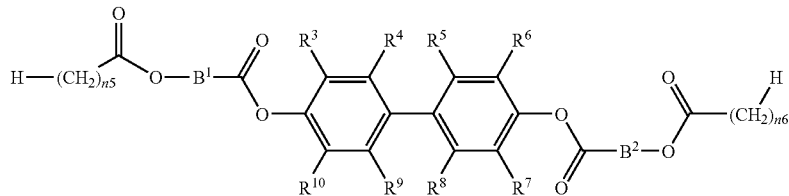
(XXIIIb)

-continued

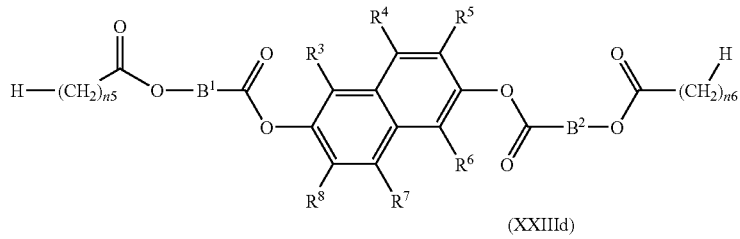
(XXIIIc)

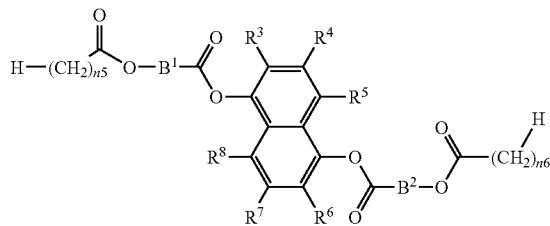
(XXIIId)

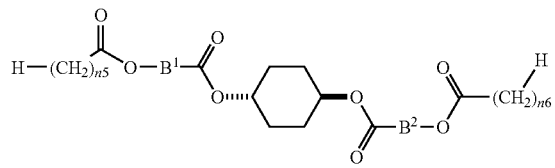
(XXIIIe)

Compositions comprising compounds as described in Formulas (IXa-IXe) and the Formula (V) analogues and Formula (VI) analogues are useful in polymerizable liquid crystal compositions. Such compositions, when comprising at least one compound as described in Formula (IXa-e), exhibit broad nematic phases. Other liquid crystal monomers can be added to the composition to provide nematic phases over broad temperature ranges. Preferred compositions comprise at least one compound as described in Formula (IXa) wherein $B^1$ and $B^2$ are $R^{11}$-substituted-1,4-phenyl; and $R^1$ and $R^2$ are each independently H or $CH_3$. Within this group of compositions, a more preferred composition further comprises at least one compound wherein one of the group $R^3$-$R^6$ is Cl or $CH_3$; and three of the group $R^3$-$R^6$ are H; which is exemplified by the compound represented by the structure of the following Formula (XXIV).

prise at least one compound of Formula (XXIV). Other preferred compositions comprise at least one compound as described in Formula (VIIIa) and/or Formula (IXa) wherein $R^1$ and $R^2$ are H; one of the groups $R^3$-$R^6$ is $CH_3$; and three of the groups $R^3$-$R^6$ are H. The preparation of these compositions is described below.

In another embodiment, the total amount of compounds of Formula (IV) are present in the range of about 0.1 mole percent to about 95 mole percent, based on the composition. In another embodiment, the total amount of compounds of Formula (IV) are present in the range of about 5 mole percent to about 95 mole percent. In another embodiment, the total amount of compounds of Formula (IV) are present in the range of about 20 mole percent to about 80 mole percent.

In another embodiment, the total amount of compounds of Formula (V) are present in the range of about 5 to about 50

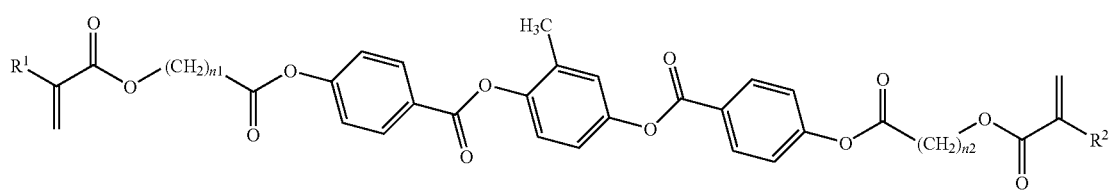
(XXIV)

Within these preferred compositions, more preferred are those comprising compounds wherein n1 and n2 are, independently, integers 3 to 10. The synthesis of these compositions is described below.

Another embodiment of the invention hereof provides a composition comprising at least one compound of each of the Formulas (IV), (V), and (VI), wherein for at least one compound of each of the Formulas (IV), (V), and (VI), m is 1 and p is 0; and wherein for at least one compound of each of the Formulas (IV), (V), and (VI), m is 1 and p is 1. Such compositions are useful in polymerizable liquid crystal compositions, and can exhibit nematic phases at or near room temperature (RT). Other liquid crystal monomers can be added to the composition to provide nematic phases over broad temperature ranges. Preferred compositions comprise at least one compound as described in Formula (VIIIa) and/or Formula (IXa) wherein $R^1$-$R^6$ is H. Other preferred compositions commole percent, based on the composition. In another embodiment, the total amount of compounds of Formula (V) are present in the range of about 10 mole percent to about 50 mole percent.

In another embodiment, the total amount of compounds of Formula (VI) are present in the range of about 0.1 mole percent to about 90 mole percent, based on the composition. In another embodiment, the total amount of compounds of Formula (VI) are present in the range of about 0.1 mole percent to about 60 mole percent.

When the compositions of this invention are prepared by one embodiment of a process hereof (such as is disclosed below), rather than by synthesizing each compound individually and then combining them to form the desired composition, one result of the use of that embodiment of the process is that the relative amounts of the compounds of each of the Formulas (IV), (V), and (VI) in the composition will be determined by a fixed relationship that is given effect by the process. When the composition is prepared by that embodiment of a process hereof, a desired amount of the compounds of one of Formulas (IV), (V) or (VI) is pre-selected, and an appropriate ratio of the reactants is employed to produce the desired amount of the compounds of that Formula. The ratio of reactants selected to produce the desired amount of one of the Formula (IV), (V) or (VI) compounds will, however, also produce an amount of the other two compounds that adheres to the fixed relationship. For example, in this embodiment of the process, the amount of each of the Formula (IV), (V) or (VI) compounds that is produced in relation to the amount of bromine leaving groups used in the reactants will adhere to a fixed relationship that may be determined in advance. The variation of the amount of each compound produced in relation to the amount of leaving groups used may be represented graphically, and one example is charted in FIG. 1 wherein the relative percentage of Formula (IV) compounds produced is represented by curve 1, the relative percentage of Formula (V) compounds produced is represented by curve 2, and the relative percentage of Formula (VI) compounds produced is represented by curve 3.

The choice of what amount to pre-select for which of the compounds of the Formulas (VI), (V) or (VI) depends on the desired end use of the composition, for example the degree of flexibility or brittleness desired. For example, a composition comprising smaller amounts of the compounds of Formulas (V) and (VI) can result in a denser polymer network and harder material, while a composition comprising larger amounts of compounds of Formulas (V) and (VI) can provide a less dense polymer network and softer material. The preparation by a process hereof of the compositions hereof, which comprise at least one compound of each of the Formulas (IV), (V) and (VI), can thus provide advantages over compositions comprising a single compound, compositions comprising compounds of less than all of the Formulas (IV), (V) and (VI), or compositions prepared by blending separately made compounds because the physical properties of the compositions hereof may thus be tuned by adjusting the relative percentage content of each of the Formula (IV), (V) and (VI) compounds. For example, the rate of crystallization, the thermal characteristics, or the degree of crosslinking (and thus the flexibility or brittleness) of a composition hereof may be adjusted in such manner.

Another embodiment of the invention hereof is a process for preparing a composition comprising at least one compound of each of the Formulas (IV), (V), and (VI). In one embodiment, a composition can be prepared by a process in which an intermediate composition is formed, the intermediate composition comprising at least one compound as represented by the structures of each of the following Formulas (I), (II) and (III),

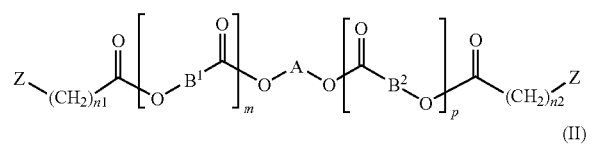

(I)

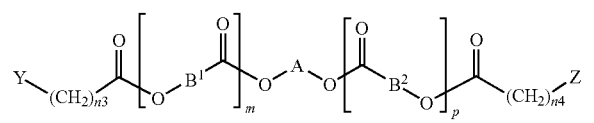

(II)

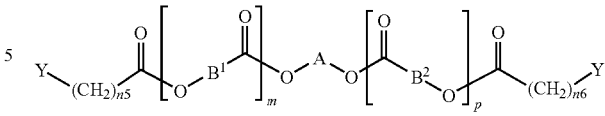

(III)

wherein Z is Br, I, —OTs, —OTf, or —OMs; and Y is H. In Formulas (I), (II), and (III), the groups and subscripts n1, n2, n3, n4, n5, n6, m, p, A, $B^1$, and $B^2$ are as defined above for Formulas (IV), (V) and (VI).

The abbreviation "—OTf", as used herein, refers to a functional group with the formula $CF_3SO_3$—, which is also referred to as a triflate or trifluoromethanesulfonate group. The abbreviation "—OTs", as used herein, refers to a functional group with the formula $CH_3C_6H_4SO_3$—, which is also referred to as a tosylate group. The abbreviation "—OMs", as used herein, refers to a functional group with the formula $CH_3SO_3$—, which is also referred to as a mesylate or methanesulfonate group. Note that Formula (VI) is the same as Formula (III) in the case where Y is H.

A process hereof may include, for example, the following steps (a), (b) and (c):

(a) providing one or more organic polyol(s) comprising at least two hydroxyl groups and at least two covalently bonded carbon atoms, each hydroxyl group being bonded to a different carbon atom within an organic polyol;

(b) reacting the organic polyol(s), optionally in the presence of a base, with (i) one or more functionalized alkyl acid(s) or alkyl acid halide(s) as represented by the structure of the following Formula (X):

$$Z—(CH_2)_n—C(O)X \qquad (X)$$

wherein X is Cl, Br, I, or OH; Z is Br, I, —OTs, —OTf, or —OMs; and n is an integer equal to 3 to 20; and (ii) one or more non-functionalized alkyl acid(s) or acid halide(s) as represented by the structure of the following Formula (XI):

$$Y—(CH_2)_t—C(O)X \qquad (XI)$$

wherein X is Cl, Br, I, or OH; Y is H; and t is an integer equal to 3 to 20; in a first reaction solvent and at a first reaction temperature to provide a mixture comprising an intermediate composition and a first spent reaction mixture, the intermediate composition comprising at least one compound of each of the Formulas (I), (II), and (III); and (c) reacting the intermediate composition with a (meth) acrylate salt in the presence of a phase transfer catalyst and a second reaction solvent at a second reaction temperature to provide a mixture comprising a composition and a second spent reaction mixture, the composition comprising at least one compound each of the Formulas (IV), (V), and (VI).

Unless otherwise specifically defined, the terms (meth) acrylate salt, (meth)acrylate ester, (meth)acrylate acid, and the like, as used herein encompass materials and moieties comprising: (i) methacrylate, for instance wherein $R^1$ and/or $R^2$ is methyl; (ii) acrylate, wherein $R^1$ and/or $R^2$ is H; (iii) chloroacrylate, wherein $R^1$ and/or $R^2$ is Cl; and (iv) fluoroacrylate, wherein $R^1$ and/or $R^2$ is F.

In particular embodiments, when X is OH, the process further comprises the use of a carbodiimide dehydrating agent; step (c) may further comprise the use of one or more radical inhibitors; and/or the second reaction solvent may be the first spent reaction mixture.

In other embodiments, the polyol(s) may be selected from the group of compounds represented by the structures of the following Formulas (XIIa-XIIf):

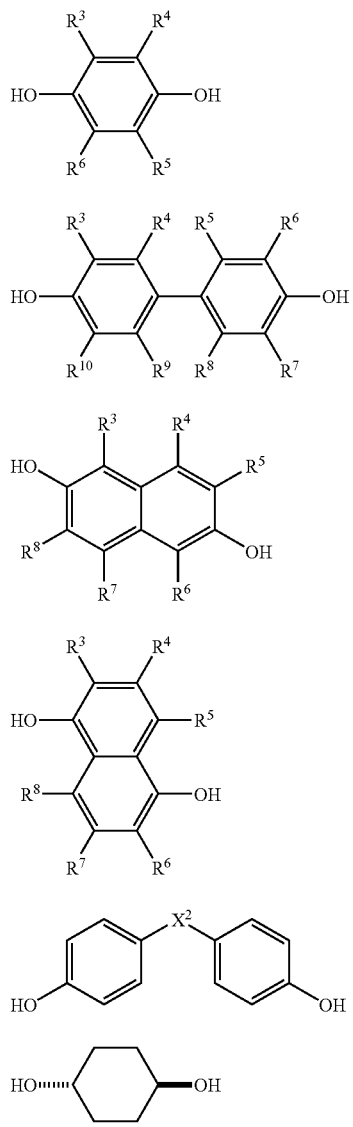

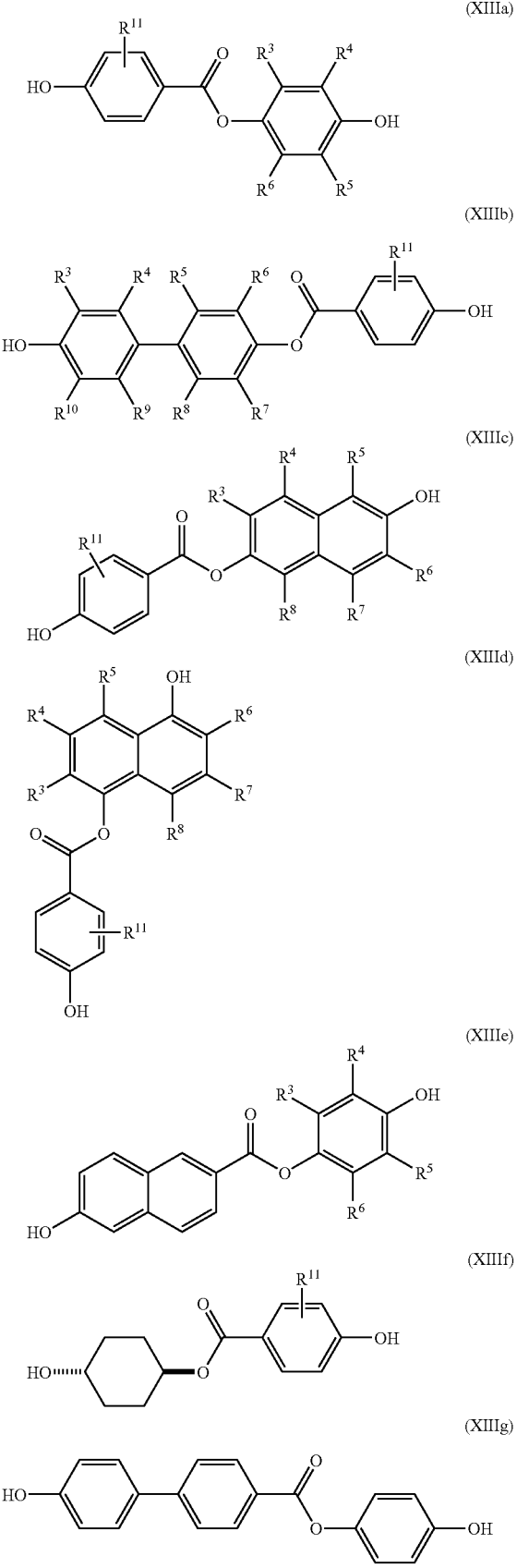

wherein $R^3$-$R^{10}$ and $X^2$ are as described above. These embodiments of the process hereof can be used to provide compositions comprising compounds of Formula (VIIa-VIIf) as described above. Examples of particular diols of Formula (XIIa-XIIf) suitable for use in the process include: hydroquinone, methylhydroquinone, chlorohydroquinone, 4,4'-dihydroxybiphenyl, 2,6-dihydroxynapthalene, 1,5-dihydroxynapthalene, Bisphenol A, 6F-Bisphenol A, 4,4'-oxydiphenol, and trans-1,4-cyclohexanediol.

In other embodiments of the processes hereof, the polyol(s) may include one or more ester diols selected from the group of compounds represented by the structures of the following Formulas (XIIIa-XIIIg):

wherein $R^3$–$R^{11}$ are as described above. These embodiments of the processes hereof can be used to provide compositions comprising compounds of Formulas (VIIIa-VIIIe) described above. Examples of particular ester diols of Formulas (XIIIa-XIIIg) suitable for use in the process include: 4-hydroxyphenyl 4-hydroxybenzoate, 2-methyl-4-hydroxyphenyl 4-hydroxybenzoate, 3-methyl-4-hydroxyphenyl 4-hydroxybenzoate, 2-chloro-4-hydroxyphenyl 4-hydroxybenzoate, 3-chloro-4-hydroxyphenyl 4-hydroxybenzoate, 2-fluoro-4-hydroxyphenyl 4-hydroxybenzoate, 3-fluoro-4-hydroxyphenyl 4-hydroxybenzoate, 2-phenyl-4-hydroxyphenyl 4-hydroxybenzoate, 3-phenyl-4-hydroxyphenyl 4-hydroxybenzoate, 6-hydroxynaphthyl 4-hydroxybenzoate, 5-hydroxynaphtyl 4-hydroxybenzoate, 4-(4'-hydroxybiphenyl) 4-hydroxybenzoate, trans-4-hydroxycyclohexyl 4-hydroxybenzoate, trans-4-hydroxycyclohexyl 4-hydroxy-3-methoxybenzoate, 4-hydroxyphenyl 4-hydroxy-3-methoxybenzoate, 2-methyl-4-hydroxyphenyl 4-hydroxy-3-methoxybenzoate, 3-methyl-4-hydroxyphenyl 4-hydroxy-3-methoxybenzoate, 2-chloro-4-hydroxyphenyl 4-hydroxy-3-methoxybenzoate, 3-chloro-4-hydroxyphenyl 4-hydroxy-3-methoxybenzoate, 4-hydroxyphenyl 4-hydroxy-3-methylbenzoate, 2-methyl-4-hydroxyphenyl 4-hydroxy-3-methylbenzoate, and 3-methyl-4-hydroxyphenyl 4-hydroxy-3-methylbenzoate.

Other ester diols that provide compositions comprising specific compounds as described by Formula (XIIIe) derived from 6-hydroxy-2-napthalene carboxylic acid are: 6-hydroxynapthalene-2-carboxylic acid 4-hydroxyphenyl ester (CAS No. [17295-17-9]), 6-hydroxynapthalene-2-carboxylic acid 2-methyl-4-hydroxyphenyl ester, 6-hydroxynapthalene-2-carboxylic acid 3-methyl-4-hydroxyphenyl ester, 6-hydroxynapthalene-2-carboxylic acid 2-chloro-4-hydroxyphenyl ester, and 6-hydroxynapthalene-2-carboxylic acid 3-chloro-4-hydroxyphenyl ester.

Other ester diols that provide compositions comprising specific compounds as described in Formula (XIIIg) derived from 4'-hydroxy-4-biphenyl carboxylic acid include: 4'-hydroxybiphenyl-4-carboxylic acid 4-hydroxyphenyl ester, 4'-hydroxybiphenyl-4-carboxylic acid 2-methyl-4-hydroxyphenyl ester, 4'-hydroxybiphenyl-4-carboxylic acid 3-methyl-4-hydroxyphenyl ester, 4'-hydroxybiphenyl-4-carboxylic acid 2-chloro-4-hydroxyphenyl ester, and 4'-hydroxybiphenyl-4-carboxylic acid 3-chloro-4-hydroxyphenyl ester.

In other embodiments of the processes hereof, the polyol(s) may include one or more diester diol(s) selected from the group of compounds represented by the structures of the following Formulas (XIVa-XIVf):

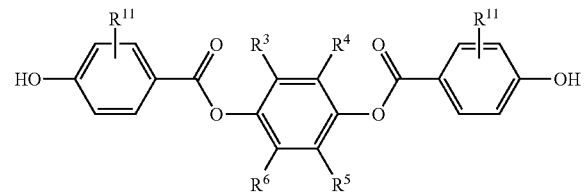
(XIVa)

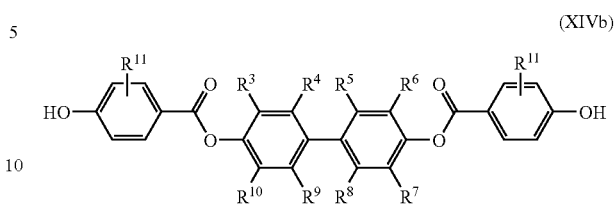
(XIVb)

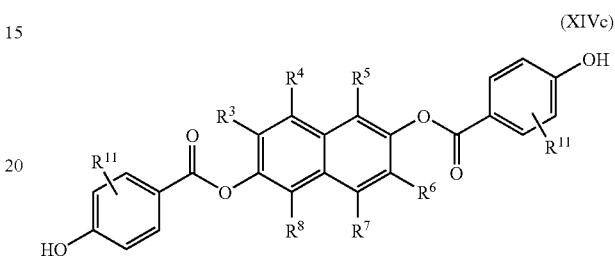
(XIVc)

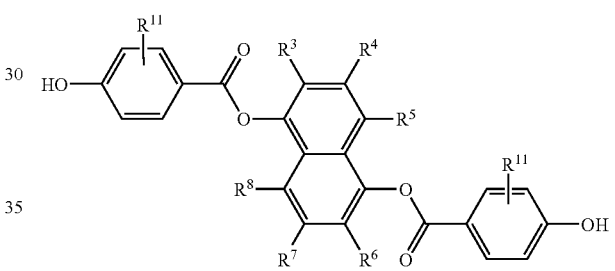
(XIVd)

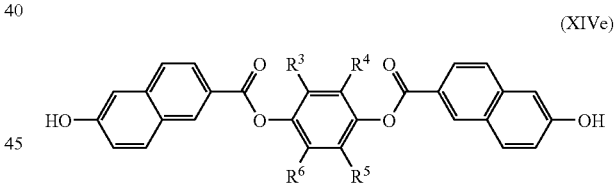
(XIVe)

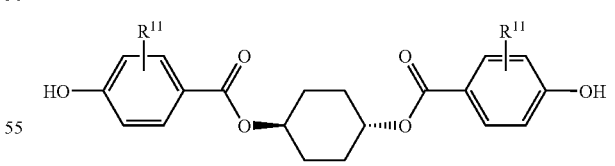
(XIVf)

wherein $R^3$-$R^{11}$ are as described above. These embodiments of the process can be used to provide compositions comprising compounds as described in Formulas (IXa-IXe) as described above. Specific diester diols of Formulas (XIVa-XIVf) useful and preferred in the process include compounds listed in Table 1 that are specific examples of compounds of Formulas (XIVa-XIVf).

TABLE 1
Examples of Diester Diols of Formulas (XIVa-f).
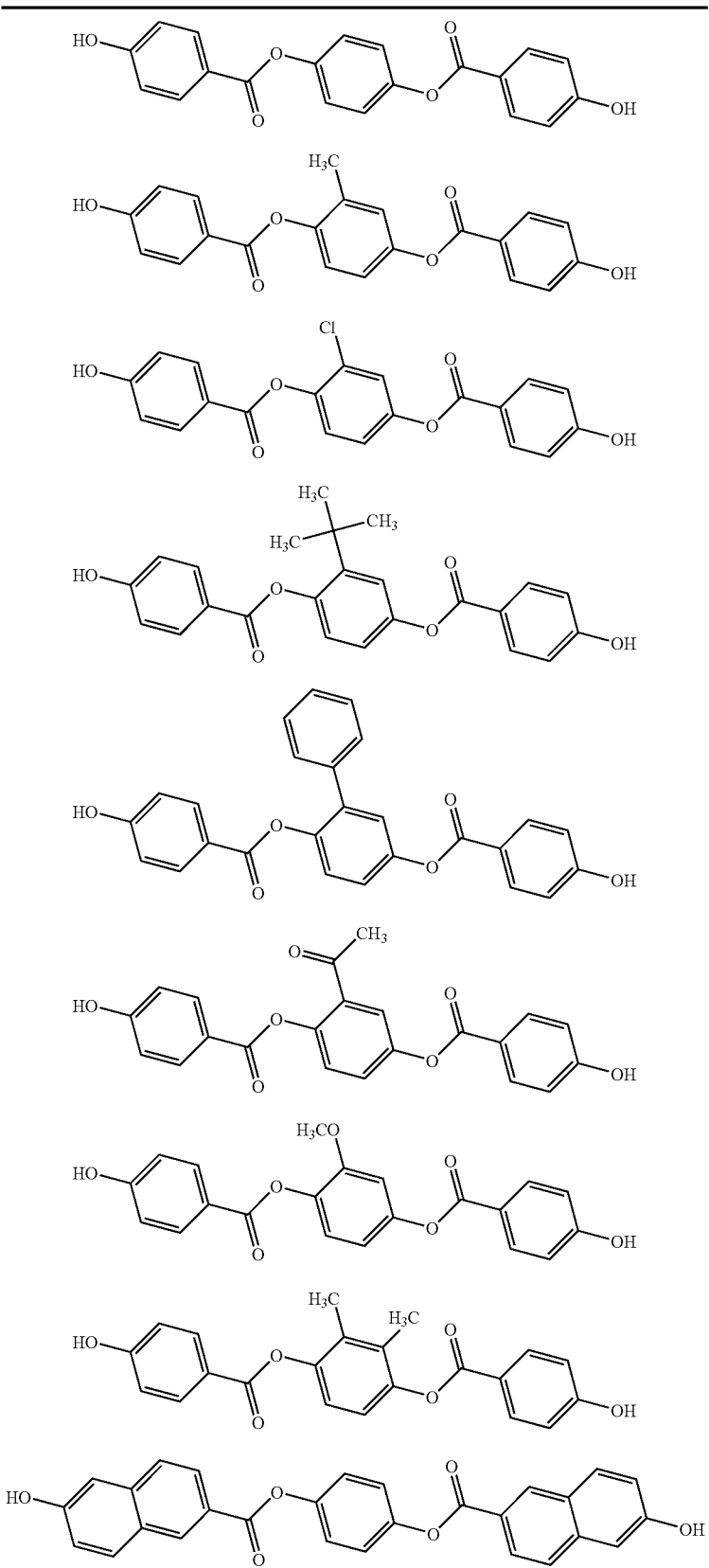

TABLE 1-continued
Examples of Diester Diols of Formulas (XIVa-f).
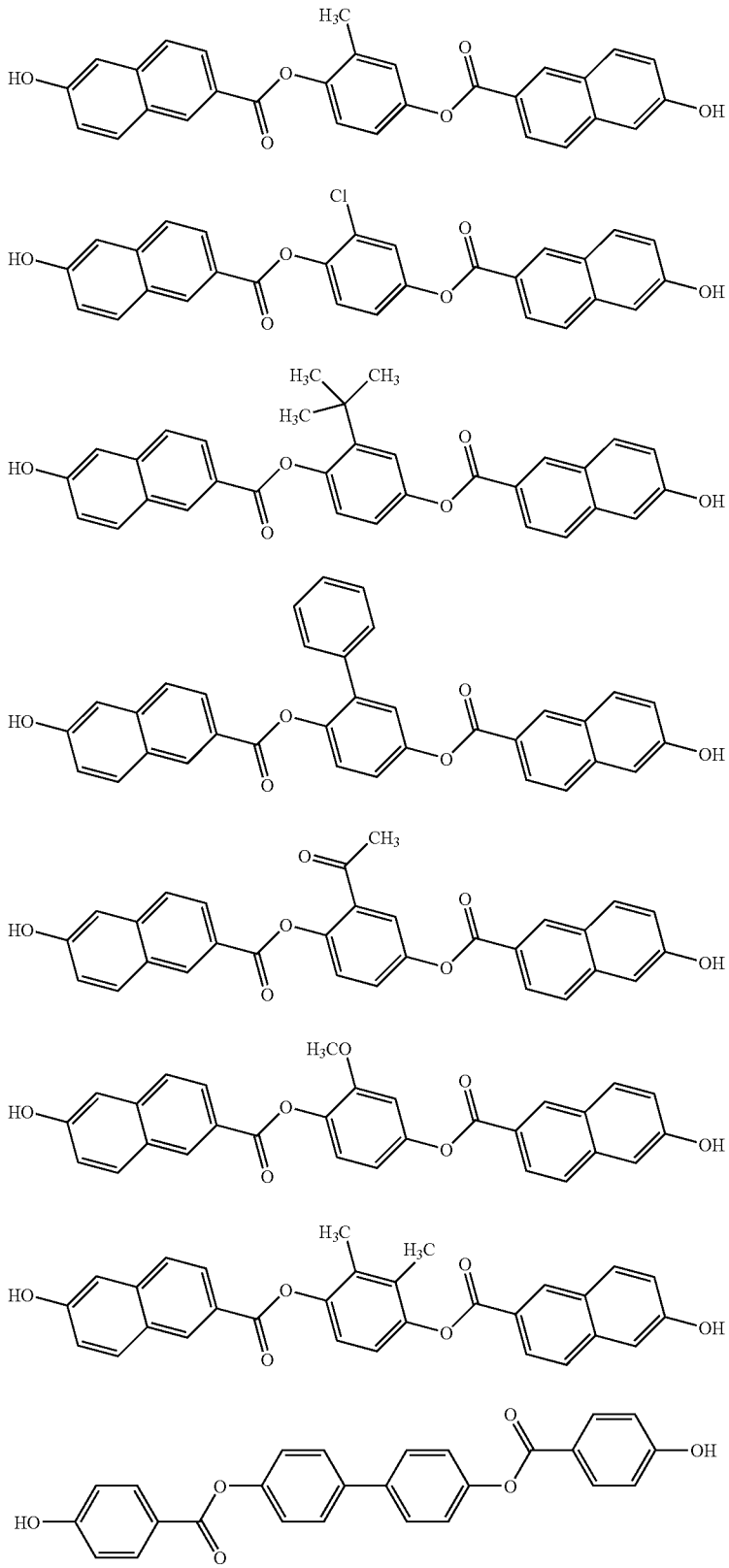

TABLE 1-continued

Examples of Diester Diols of Formulas (XIVa-f).

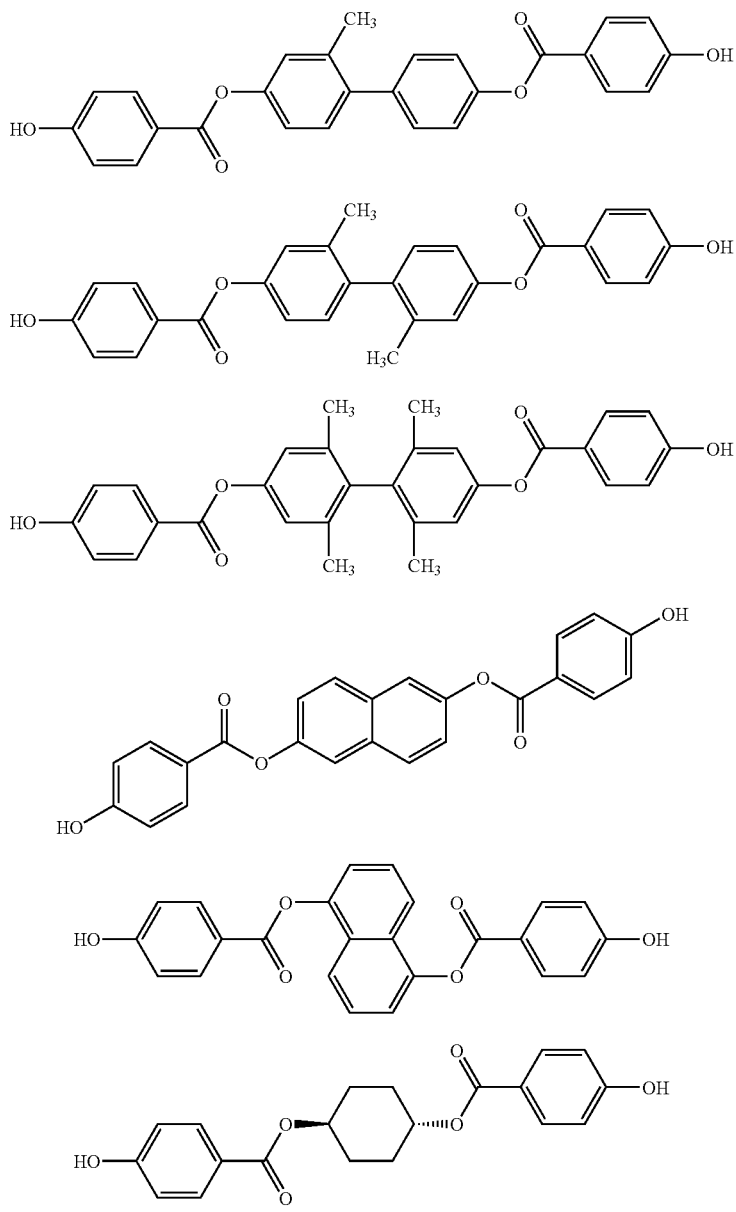

Using a mixture of two or more polyols is one means to increase the complexity of the product distribution of the resulting composition. This can be a way to tune the properties of the composition or the properties of its end use. The polyols can be selected to provide a composition having two or more mesogens, for example a composition wherein for at least one compound of each of the Formulas (IV), (V) and (VI) m is 1 and p is 0, and wherein for at least one compound of each of the Formulas m is 1 and p is 1. Other combinations of polyols can also be used.

Preferred functionalized alkyl acid halide(s) as described in Formula (X) are acid chlorides (X═Cl). In one embodiment in Formula (X), Z is Br. Preferred non-functionalized alkyl acid halide(s) as described in Formula (XI) are acid chlorides (X═Cl).

When the organic polyol is a diol, the total amount of the functionalized alkyl acid halide(s) and the non-functionalized alkyl acid halide(s) is preferably about 1.8 to about 2.5 equivalents, and more preferably about 2.0 equivalents, based on the amount of the diol. The relative amounts of the functionalized and non-functionalized alkyl acid halides used determine the relative amounts of the compounds of Formulas (IV), (V) and (VI) obtained in the composition. For example, a 1:1 mixture (on a mole basis) of a functionalized and a non-functionalized alkyl acid halide provides a composition wherein the relative molar amounts of the compounds of Formulas (IV), (V) and (VI) are 1:2:1, respectively. Alternatively, a 4:1 mixture (on a mole basis) of a functionalized and a non-functionalized alkyl acid halide (for example, 1.6 equivalents of a functionalized and 0.4 equivalents of a non-functionalized alkyl acid halide, relative to the diol) results in a composition having 64 mol % compounds of Formula (IV), 32 mol % compounds of Formula (V), and 4 mol % compounds of Formula (VI). For a given ratio of functionalized to non-functionalized alkyl acid halide(s), the distribution of products is a statistical mixture of all the possibilities. Increasing the total number of functionalized and/or non-functionalized alkyl acid halides is one means to increase the complexity of the product distribution, i.e. the number of compounds of each Formula in the resulting composition.

In one embodiment, the relative amounts of the functionalized and non-functionalized alkyl acid halides are selected to provide a composition comprising at least one compound of each of the Formulas (IV), (V) and (VI) wherein the total amount of compounds of Formula (IV) are present in the range of about 0.1 mole percent to about 95 mole percent, based on the content of the total composition. In another embodiment, the relative amounts of the functionalized and non-functionalized alkyl acid halides are selected to provide a composition wherein the total amount of the compounds of Formula (IV) are present in the range of about 5 mole percent to about 95 mole percent, based on the content of the total composition. In another embodiment, the relative amounts of the functionalized and non-functionalized alkyl acid halides are selected to provide a composition wherein the total amount of the compounds of Formula (IV) are present in the range of about 20 to about 80 mole percent, based on the content of the total composition.

In another embodiment, the relative amounts of the functionalized and non-functionalized alkyl acid halides are selected to provide a composition comprising at least one compound of each of the Formulas (IV), (V) and (VI), wherein the total amount of compounds of Formula (V) are present in the range of about 5 mole percent to about 50 mole percent, based on the content of the total composition. In another embodiment, the relative amounts of the functionalized and non-functionalized alkyl acid halides are selected to provide a composition wherein the total amount of compounds of Formula (V) are present in the range of about 10 to about 50 mole percent, based on the content of the total composition.

In another embodiment, the relative amounts of the functionalized and non-functionalized alkyl acid halides are selected to provide a composition comprising at least one compound of each of the Formulas (IV), (V) and (VI), wherein the total amount of compounds of Formula (VI) are present in the range of about 0.1 mole percent to about 90 mole percent, based on the content of the total composition. In another embodiment, the relative amounts of the functionalized and non-functionalized alkyl acid halides are selected to provide a composition wherein the total amount of compounds of Formula (VI) are present in the range of about 0.1 mole percent to about 60 mole percent, based on the content of the total composition.

This process, or derivations thereof using several functionalized alkyl acid halides in conjunction with several non-functionalized alkyl acid halides, is a convenient and preferred process to provide in step (b) complex intermediate compositions, which are converted in step (c) to complex compositions comprising at least one compound of each of the Formulas (IV), (V) and (VI).

The first reaction solvent can be any solvent known in the art to be useful in performing acid halide condensations with alcohols, including alkyl ethers such as tetrahydrofuran (THF), dioxane or dimethoxyethane; alkyl esters such as ethyl acetate or butyl acetate; hydrocarbons such as xylenes or toluene; halogenated hydrocarbons such as 1,2-dichloroethane or dichloromethane; and amides such as dimethylformamide or dimethylacetamide (DMAc). A preferred first reaction solvent is THF.

The (meth)acrylate salt useful in step (c) can be derived from neutralization of the corresponding (meth)acrylate acid including methacrylic acid, acrylic acid, 2-chloroacrylic acid, and 2-fluoroacrylic acid. The base used in the neutralization can be an alkali metal base, for instance potassium carbonate and bicarbonate; sodium carbonate and bicarbonate; lithium carbonate and bicarbonate; and cesium carbonate and bicarbonate; to provide an alkali metal (meth)acrylate salt. The base can be an alkali earth metal base, for instance magnesium, calcium or barium carbonate, to provide an alkali earth metal (meth)acrylate salt. The base also can be an amine base, and particularly a hindered amine base such as a tertiary aliphatic, aromatic or heterocyclic amine as described above; to provide an ammonium (meth)acrylate salt. Preferred (meth)acrylate salts for step (c) are selected from the group: potassium(meth)acrylate and ammonium(meth)acrylates selected from the group: triethylammonium.

The (meth)acrylate salt can be obtained from commercial sources or it can be prepared in a separate process step and used directly or purified by one or more methods known in the art such as washing, filtering, drying, recrystallizing, or precipitating the salt; or it can be made in situ by neutralization of a (meth)acrylate acid with a base. In a preferred embodiment of the invention, the (meth)acrylate salt is provided by mixing (meth)acrylic acid and an alkali metal carbonate selected from the group: potassium hydrogen carbonate and potassium carbonate, in a molar ratio of about 1:1 to about 1:5, respectively, in the second reaction solvent.

In another embodiment of the processes hereof, the amount of (meth)acrylate salt to be used is about 1.0 to about 10.0 equivalents per equivalent of the total Z end groups of the compounds of Formulas (I) and (II). Preferably the (meth)acrylate salt is an acrylate salt.

The phase transfer catalyst that may be used in step (c) is a substance that, being at least partly present in or wetted by a first (usually organic) phase, promotes reaction between a reactant in the first phase and a reactant that it transfers to the first phase from a second phase, usually an aqueous or a solid phase. After reaction, the phase transfer catalyst is released for transferring further reactant. Suitably the phase transfer catalyst is a quaternary ammonium or phosphonium salt, preferably containing bulky organic groups, usually alkyl or aralkyl groups, to make it soluble in the organic phase. It is preferred that the phase catalyst is a tetraalkyl or aralkyl (e.g. benzyl) trialkyl ammonium or phosphonium salt in which the total number of carbon atoms attached to each nitrogen or phosphorus atom is at least 4. Other substances suitable for use herein as the phase transfer catalyst include those reviewed by E. V. Dehmlow in *Angewante Chemie*, (International Edition), 13, 170 (1974).

Quaternary ammonium salts suitable for use as the phase transfer catalyst herein include: cetyltrimethylammonium bromide, dicetyldimethylammonium chloride, octyltributylammonium bromide, trioctylmethylammonium chloride (available as Aliquat™ 336), benzyldimethyllaurylammonium chloride, benzyltriethylammonium chloride, dilauryldimethylammonium chloride, tetrabutylammonium bromide, tetrabutylammonium hydrogen sulfate, and tetrabutylammonium iodide. Quaternary phosphonium salts suitable for use as the phase transfer catalyst herein include cetyltripropylphosphonium bromide and triphenylethylphosphonium bromide. Other phase transfer catalysts that may be used include crown ethers and polyethylene glycol variants. The phase transfer catalyst may be present in an amount ranging from about 0.001 to about 0.9 mole equivalents, and preferably about 0.1 to about 0.7 mole equivalents, of the compounds of Formulas (I) and (II). A preferred phase transfer catalyst is selected from the group: tetrabutylammonium iodide, tetrabutylammonium bromide, and tetraheptyl ammonium bromide; and crown ethers selected from the group: 18-crown-6, CAS No. [17455-13-9]; benzo-18-crown-6, CAS No. [14078-24-9]; 15-crown-5, CAS No. [33100-27-5]; and benzo-15-crown-5, CAS No. [140-44-3].

The second reaction solvent can be any solvent known in the art to be useful in performing a nucleophilic displacement of Z with a (meth)acrylate salt. However, there is a preference for particular second reaction solvents that are aprotic in structure, and have a dipole moment of about 3.5 or less. Solvents that are aprotic in structure are those that are devoid of active hydrogens such as hydroxyl or acid functionality. Solvents having these characteristics provide high rates of conversion of the polyfunctionalized aryl alkanoate ester(s) to product while maintaining a very low level of undesired ester cleavage products. Preferred second reaction solvents include those selected from the group: alkyl ethers including tetrahydrofuran, dioxane and dimethoxyethane; ketones including acetone and 2-butanone; alkyl esters including butyl acetate and ethyl acetate; and acetonitrile. In one embodiment, the second reaction solvent may be the first spent reaction mixture.

The first reaction temperature and second reaction temperature are reaction temperatures that give a reasonable rate of reaction with a minimum of by-products. The first reaction temperature generally is between −30° C. and about 50° C., and preferably about 0° C. to about room temperature (RT, eg 25° C.). The second reaction temperature is generally about room temperature to about 120° C., and preferably about 50° C. to about 100° C.

A base, when optionally used in step (b), can include an inorganic base, for instance an alkali metal or alkali earth metal hydroxide, carbonate or bicarbonate; or an organic base such as an amine base that has at least two aliphatic groups, or in which the N atom is in a cycloaliphatic or aromatic ring, substituted in a manner that induces steric crowding around the N atom. Typically the amine base will be of low water solubility and have a $pK_a$ of the conjugate acid of about 10. Thus, it may be a heteroaromatic base such as pyridine or a substituted pyridine, for example 2,6-dimethylpyridine; or it may be a secondary amine providing it is sufficiently sterically hindered. An example of a suitable secondary amine is 2,2,6,6-tetramethyl-piperidine. Preferably, however, it is a tertiary amine of formula $R^{12}R^{13}R^{14}N$ wherein $R^{12}$, $R^{13}$ and $R^{14}$ are each independently $C_1$-$C_{10}$ alkyl groups or $C_3$-$C_6$ cycloalkyl groups. The alkyl groups may be straight or branched chain. Examples of suitable alkyl groups include methyl, ethyl, isopropyl, n-propyl, n-butyl, sec-butyl and tert-butyl. Suitable tertiary amines of formula $R^{12}R^{13}R^{14}N$ are, for example, N,N-diisopropylethylamine, N,N-dimethylaniline, triethylamine, t-butyldimethylamine, N,N-diisopropylmethylamine, N,N-diisopropylisobutylamine, N,N-diisopropyl-2-ethylbutylamine, tri-n-butylamine. Preferred are amine bases selected from the group: triethylamine, diisopropylethylamine, tributyl amine, pyridine, and 2,6-dimethylpyridine. The base is preferably present in an amount of about 0.8 to about 5 equivalents per equivalent of the total alkyl acid halide(s) used, that is, the sum of the functionalized and the non-functionalized alkyl acid halides.

When the base optionally used in step (b) is an amine base, a by-product of the reaction is an amine salt such as an amine hydrochloride. In one embodiment the amine salt is removed from the first spent reaction mixture by, for instance, filtering the reaction mixture. This is a convenient and preferred process wherein the second reaction solvent can include the first reaction solvent. In another embodiment, the mixture of aryl alkanoate esters of the intermediate composition provided by step (b) can be separated from the first spent reaction mixture by a variety of methods known in the art. Preferred methods include any one or more of the steps: filtering the amine salt by-product; precipitating the reaction mixture into water and filtering; partitioning the reaction mixture with water and/or organic solvents; washing with reaction mixture with water; drying the reaction mixture with a drying agent; removal of solvent by evaporation; and washing the crude product with one or more solvents which selectively remove byproducts without dissolving the mixture of compounds of Formulas (I), (II), and (III).

When used in step (b), a suitable carbodiimide dehydrating agent may be any diimide commonly used in coupling acids with alcohols and phenols. A preferred carbodiimide for step (b) is dicyclohexylcarbodiimide.

A radical inhibitor, when used in step (c), may include any radical inhibitor known to inhibit radical polymerization reactions of (meth)acrylate groups including 2,6-di-tert-butylphenol, 2,6-di-tert-butyl-4-methylphenol, 2,6-di-tert-butyl-4-ethylphenol, 2-methyl-6-tert-butylphenol, 2,4,6-tri-tert-octylphenol, 2,4-dimethyl-6-tert-butylphenol, 2-tert-butyl-6-(a-methylbenzyl)phenol, 2,4-di-tert-octylphenol, 2,6-di-tert-butyl-4-methoxyphenol, 2,6-di-tert-octyl-4-decoxyphenol, 2-tert-butyl-4-chlorophenol, 2,6-di-tert-butyl-4 (N,N'-dimethylaminomethyl-phenol), 2,2'-methylene-bis(4-methyl-6-tert-butylphenol), 2,2'-methylene-bis(4-ethyl-6-tert-butylphenol), 2,2'-methylene-bis(4-methyl-6-nonylphenol), 4,4'methylenebis(2,6-di-tert-butylphenol), 4,4'-bis(2,6-di-tert-butylphenol), 4,4'-bis(2-methyl-6-tert-butylphenol), 4,4'-isopropylidenebis(2,6-di-tert-butylphenol), 1,4-hydroquinone, 4-methoxyphenol and the like; phosphorus compounds such as tri(nonylphenyl)phosphate, tridecyl phosphite, and the like; naphthol-based compounds such as 1,2-dihydroxynaphthalene, 1-amino-2-naphthol, 1-nitro-2-naphthol and the like; amine compounds such as trimethylamine, phenyl-β-naphthylamine, p-phenylenediamine, mercaptoethylamine, N-nitrosodimethylamine, benzotriazoles, phenothiazine, halo-dihydro-2,2,4-trimethylquinone and the like; or sulfur compounds such as dilaurylthio dipropionate, dilauryl sulfide and 2-mercaptobenzimidazole. The above list is not intended to be exhaustive; numerous classes of compounds that inhibit formation of radicals in organic materials are well known, and can be used in the practice of this process. The radical inhibitor can be a single compound, or a mixture or combination of two or more of such compounds. The preferred radical inhibitors are selected from the group: 2,6-di-tert-butyl-4-methylphenol, phenothiazine and tridecyl phosphate.

In another embodiment, the process further comprises separating the composition comprising at least one compound each of the Formulas (IV), (V), and (VI) provided by step (c) from the second spent reaction mixture. This can be done by a variety of methods known in the art including any one or more of the steps: filtering the second spent reaction mixture; precipitating the reaction mixture into water and filtering; partitioning the reaction mixture with water and/or organic solvents; washing the reaction mixture with water; drying the reaction mixture with a drying agent; removal of solvent by evaporation; and washing the crude product with one or more solvents that selectively remove byproducts without dissolving the compounds of the composition.

Another embodiment of this invention is a process for preparing the composition wherein for each compound of the composition, m and/or p is 2. The process comprises (a) providing one or more polyol(s) selected from the group of those described by Formulas (XIIIa-XIIIg) and (XIVa-XIVf); and (b) reacting the polyol(s) with one or more (meth)acrylate aryl acid halides of the Formulas (XVa-XVc):

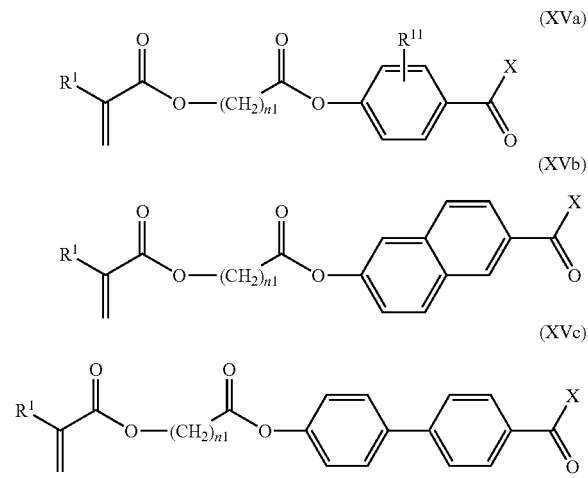

wherein X is Cl or Br, n1 is an integer 3 to 20; and $R^1$ and $R^{11}$ are as described above; and a first reaction solvent at a first reaction temperature, as described above, to provide a composition comprising one or more poly(meth)acrylate aryl alkanoate ester(s) of Formula (IV), one or more mono(meth)acrylate aryl alkanoate ester(s) of Formula (V), and one or more non-functionalized aryl alkanoate ester(s) of Formula (VI), wherein m and/or p is 2 for each compound of the composition. Preferably step (b) includes the use of a base and one or more radical inhibitors, as described above.

The preparation of (meth)acrylate aryl acid halides of Formulas (XVa-XVc) is disclosed in US-A-2007/0228326. In the processes described above, the contents of the reaction mixture are used in at least an amount that is sufficient to enable the reaction to proceed to provide the stated product at a rate and with a yield that is commercially useful.

Another embodiment of this invention is a composition as prepared by a process of the invention. Such a composition, which may be a composition comprising at least one compound of each of the Formulas (IV), (V), and (VI) is obtained by (a) providing one or more organic polyol(s) comprising at least two hydroxyl groups and at least two covalently bonded carbon atoms, each hydroxyl group being bonded to a different carbon atom within an organic polyol;

(b) reacting the organic polyol(s), optionally in the presence of a base, with (i) one or more functionalized alkyl acid(s) or acid halide(s) as represented by the structure of the following Formula (X):

wherein X is Cl, Br, I, or OH; Z is Br, I, —OTs, —OTf, or —OMs; and n is an integer equal to 3 to 20; and (ii) one or more non-functionalized alkyl acid(s) or acid halide(s) as represented by the structure of the following Formula (XI):

wherein X is Cl, Br, I, or OH; Y is H; and t is an integer equal to 3 to 20; in a first reaction solvent at a first reaction temperature to provide a mixture comprising an intermediate composition and a first spent reaction mixture, the intermediate composition comprising at least one compound of each of the Formulas (I), (II), and (III); and (c) reacting the intermediate composition with a (meth)acrylate salt in the presence of a phase transfer catalyst and a second reaction solvent at a second reaction temperature to provide a product mixture comprising the composition and a second spent reaction mixture.

The compositions of the invention, such as those comprising at least one compound of Formulas (VIIIa-VIIIe) and (IXa-IXe), are useful in liquid crystal compositions, which are another embodiment of the invention. Many of these compositions exhibit nematic phases upon melting. They can be mixed with other liquid crystal monomers to provide nematic phases over broad temperature ranges at or near room temperature. Compositions of various embodiments of the invention are given in the examples below with their corresponding thermal transitions that define their respective nematic phases.

An additional embodiment of the invention is a liquid crystal composition comprising a composition which comprises at least one compound each of the Formulas (IV), (V) and (VI), as defined above. In further embodiments, the liquid crystal composition includes at least one chiral compound. Compositions comprising at least one compound each of the Formulas (IV), (V) and (VI) as provided by this invention are polymerizable nematic compositions. Such a composition can be mixed with conventional nematic liquid crystals or polymerizable liquid crystals to form polymerizable nematic compositions. Compositions as provided by this invention can further be mixed with chiral compounds, including polymerizable and/or non-polymerizable chiral monomers and/or polymerizable and/or non-polymerizable chiral nematic liquid crystals, to form polymerizable twisted nematic compositions, which are also an embodiment of the invention. A preferred liquid crystal composition comprises a composition wherein at least one compound of Formula (IV) is as described by Formula (IXa).

Chiral compounds, including cholesteryl esters or carbonates, such as benzoate esters, alkyl esters and alkyl carbonates of cholesterol, are known to exhibit cholesteric phases and are known to be useful in inducing chirality in a nematic phase to produce a twisted nematic phase. The terms "twisted nematic phase", "cholesteric phase" and "chiral nematic" as used herein are synonymous. Cholesteryl esters useful for incorporation into liquid crystal compositions of this invention include cholesteryl benzoate, cholesteryl 4-alkylbenzoates and cholesteryl 4-alkoxybenzoates wherein the alkyl and alkoxy groups are $C_1$ to $C_8$ straight or branched chain alkyl groups, cholesteryl propionate, cholesteryl butanoate, cholesteryl hexanoate, cholesteryl octanoate, cholesteryl decanoate, cholesteryl undecantoate, cholesteryl dodecanoate, cholesteryl hexadecanoate, and cholesteryl octadecanoate. Cholesteryl carbonates useful for this purpose include phenyl cholesteryl carbonate, 4-alkylphenyl cholesteryl carbonates, 4-alkoxyphenyl cholesteryl carbonates, and alkyl cholesteryl carbonates wherein the alkyl or alkoxy groups are $C_1$ to $C_8$ straight or branched chain alkyl groups.

In one embodiment of a composition of this invention, the incorporated chiral compounds are polymerizable chiral monomers and include polymerizable cholesterol derivatives as described in U.S. Pat. No. 4,637,896; polymerizable terpenoid derivatives as described in U.S. Pat. No. 6,010,643; polymerizable derivatives wherein the chiral center is an asymmetric carbon atom of a branched alkyl chain as described in U.S. Pat. No. 5,560,864; polymerizable derivatives of vicinal diols or substituted vicinal diols as described in U.S. Pat. Nos. 6,120,859 and 6,607,677; and polymerizable chiral compounds as described in U.S. Pat. Nos. 6,723,395, 6,217,792, 5,942,030, 5,885,242, and 5,780,629. Additional examples of suitable chiral compounds are described in copending and commonly owned published US-A-2007/0267599, WO 2009/023759, and WO2009/023762. The references listed above in this paragraph is by this reference each incorporated in its entirety as a part hereof for all purposes.

A preferred group of polymerizable chiral monomers for use in the compositions of this invention are those of Formula (XVI):

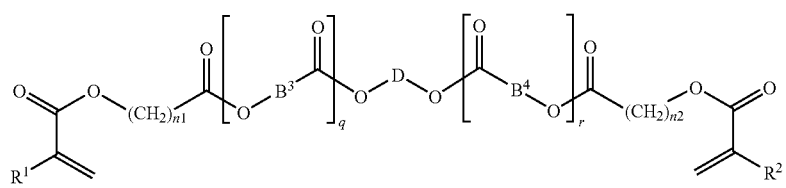

(XVI)

wherein $R^1$ and $R^2$ are each independently selected from the group: H, F, Cl and $CH_3$; n1 and n2 are each independently integers 3 to 20; q and r are each independently integers 0, 1 or 2 with the proviso that q+r is $\geq 1$; D is a divalent chiral radical selected from the group:

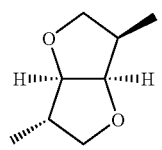

(D1)

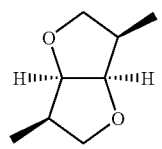

(D2)

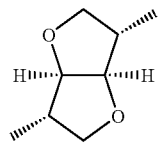

(D3)

and $B^3$ and $B^4$ are each divalent radicals independently selected from the group: $R^{11}$-substituted-1,4-phenyl, wherein $R^{11}$ is H, —$CH_3$ or —$OCH_3$; 2,6-naphthyl; and 4,4'-biphenyl; provided that when q+r=3, at least one of $B^3$ and $B^4$ is $R^4$-substituted-1,4-phenyl; and when q+r=4, at least two of $B^3$ and $B^4$ are $R^4$-substituted-1,4-phenyl. Preferably $R^1$ and $R^2$ are independently H, or $CH_3$; and n1 and n2 are independently an integer 3 to 10.

Choices may be made from within and among the prescribed ranges for the variable radicals and substituents such that the compound of Formula (XVI) is, for example, either symmetric or asymmetric. Another preferred group of polymerizable chiral monomers for practicing this invention are those of Formula (XVII):

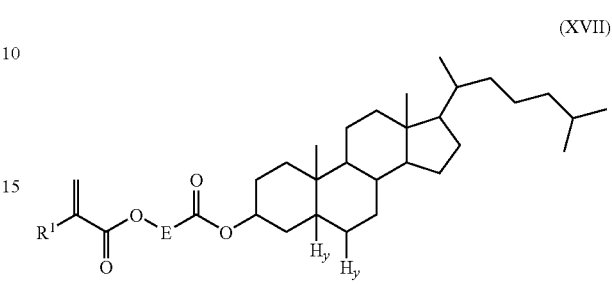

(XVII)

wherein $R^1$ is selected from the group: H, F, Cl and $CH_3$; E is selected from the group: —$(CH_2)_{n7}$—, —$(CH_2)_{n8}O$—, and —$(CH_2CH_2O)_{n9}$—; n7 and n8 are each integers 3 to 20; n9 is an integer 1 to 4; and y is an integer 0 or 1.

The liquid crystal compositions provided by this invention are mixtures useful in preparing polymer networks that exhibit the fixed optical properties of nematic or twisted nematic polymer networks. A polymer network as provided by this invention is one or more polymerized layer(s) comprising a liquid crystal composition that may be fabricated in a form such as polymerized films, coatings, castings and prints, including patterned, unpatterned, variable and nonvariable optical properties, and that can be made by a wide variety of methods as disclosed, for instance, in U.S. Pat. Nos. 4,637,896, 6,010,643 and 6,410,130, each of which is by this reference incorporated in its entirety as a part hereof for all purposes.

In particular, one preferred method for making a polymer network comprises: providing a polymerizable liquid crystal mixture, in the form of a liquid crystal or isotropic phase, with a polymerization initiator, preferably a radical initiator; applying the liquid crystal mixture to one or more substrates, where the substrate(s) may optionally comprise an alignment layer, to provide a layer of liquid crystal; optionally treating the layer to provide a desired liquid crystal phase; and polymerizing the liquid crystal phase, preferably by exposing the liquid crystal phase to actinic radiation. Actinic radiation includes, for example, heat, microwave radiation, UV and visible light, and electron beam and other radiation.

The liquid crystal compositions provided by various embodiments of this invention can include a radical initiator. Although the radical initiator is preferably a photoinitiator useful in conducting photochemical polymerizations, such initiators are not required when curing is performed by electron beams. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]phenyl)-2-(4-morpholinyl)-1-propanone, 2-hydroxy-2-methyl-1-phenyl-propan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,1-camphorquinone, ethyl-d,1-camphorquinone, mixtures of benzophenone and 4-methylbenzophenone, benzophenone, 4,4'-bisdimethylaminobenzophenone, triphenylsulfonium hexafluorophosphate or mixtures of triphenylsulfonium salts. Preferably the photoinitiators are present at a level of about 0.05 wt % to about 4 wt % based on the total weight of the polymerizable liquid crystal mixture.

Forming a liquid crystal layer in a polymer network from a composition of this invention can be accomplished by any method that gives a uniform layer, or if desired, a patterned or non-uniform layer. Coating, including rod-coating, extrusion coating, gravure coating and spin-coating, spraying, printing, blading, knifing, or a combination of methods, can be used. Coating and knifing are preferred methods. Many commercial coating machines, devices such as a coating rod and knife blade, and printing machines can be used to apply the liquid crystal mixture as a liquid crystal or isotropic phase.

The ability of a twisted nematic phase to reflect light is dependent upon the alignment or texture of the twisted nematic phase. For many applications wherein a high degree of transparency is required outside the reflection band, or in applications that require very well defined reflection bands, a high degree of uniformity in a planar or homogeneous alignment is required. Discontinuities and domain boundaries in a planar alignment can cause a high degree of haze and degradation of the reflection band. A high degree of uniformity in planar alignment can be accomplished with a combination of alignment layers and/or mechanical shearing of the twisted nematic phase during and/or after application to the substrate(s). Alignment layers typically are polymers that are applied to substrates and mechanically buffed with a rubbing cloth or optically aligned with polarized light. The buffing or optical alignment allows the liquid crystal molecules applied to the interface to align in one direction. Useful polyimide alignment layers, for example, are described in U.S. Pat. No. 6,887,455. Alignment of twisted nematic phases by coating of dilute liquid crystal mixtures is described in U.S. Pat. No. 6,410,130.

Treating the liquid crystal layer to provide a desired liquid crystal phase can include steps such as cooling or heating the liquid crystal layer, for instance to achieve a desired phase or optical property; application of a mechanical shear to the liquid crystal layer, for instance by application of a knife blade to the liquid crystal layer or shearing two or more substrates wherein the liquid crystal layer is interposed; or vibration, sonication or other form of agitation to the substrate(s).

Another preferred method for making a polymer network comprises: providing an isotropic solution comprising a polymerizable liquid crystal mixture, a polymerization initiator, preferably a photoinitiator, and a carrier solvent; applying the isotropic solution to one or more substrate(s), preferably where the substrate(s) comprises an alignment layer, to provide an isotropic layer; removing the carrier solvent and, optionally, treating the layer, to provide a desired liquid crystal phase; and polymerizing the liquid crystal phase, preferably by exposing the liquid crystal phase to actinic radiation. Procedures such as these are more fully described in U.S. Pat. Nos. 6,010,643 and 4,637,896 wherein preparation of a liquid crystal layer using two substrates to form a cell is set forth. In a similar vein, U.S. Pat. Nos. 4,637,896 and 6,410,130 describe the preparation of a liquid crystal layer from an isotropic solution, followed by polymerization. The references listed above in this paragraph is by this reference each incorporated in its entirety as a part hereof for all purposes.

Where a carrier solvent is used with the liquid crystal composition, coating and spraying are preferred methods for applying the isotropic solution. Removing the carrier solvent can be accomplished by allowing the carrier solvent to evaporate, with or without heating and/or application of a vacuum. Allowing the carrier solvent to evaporate also may be accompanied and/or followed by application of a mechanical shear to the liquid crystal layer, as described above. Examples of suitable carrier solvents are linear or branched esters, especially acetic esters, cyclic ethers and esters, alcohols, lactones, aliphatic and aromatic hydrocarbons, such as toluene, xylene and cyclohexane, chlorinated hydrocarbons, such as dichloromethane, 1,1,2,2-tetrachloroethane, and also ketones, amides, N-alkylpyrrolidones, especially N-methylpyrrolidone. Additional examples of useful solvents include tetrahydrofuran (THF), dioxane, methyl ethyl ketone (MEK), and propylene glycol monomethyl ether acetate.

Liquid crystal compositions as provided by this invention may further comprise small amounts of a polymerizable diluent that may include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate.

Liquid crystal compositions as provided by this invention may further comprise small amounts of typical additives such as one or more of surfactants, leveling agents, viscosity modifiers, wetting agents, defoamers and UV stabilizers. Selection will often be based upon observed coating and alignment quality and the desired adhesion of the final polymer network to the substrate and other layers. Typical surfactants comprise siloxy-, fluoryl-, alkyl-and alkynyl-substituted surfactants. These include the Byk® (Byk Chemie), Zonyl® (DuPont), Triton® (Dow), Surfynol® (Air Products) and Dynol® (Air Products) surfactants.

A liquid crystal polymer network as provided by this invention can be characterized and differentiated from conventional polymerizable liquid crystal bis(meth)acrylates of the general Formula (C—I), as disclosed in *Makromol Chem.* 190, 2255-2268 (1989) and U.S. Pat. No. 5,833,880 and references cited therein, by comparison of their IR absorption properties. Networks obtained upon photopolymerization of polymerizable liquid crystal bis(meth)acrylates of the general Formula (C—I) contain aryl arylate and alkyl alkanoate type ester linkages wherein $R^{15}$ is a linear, branched, or cyclic aliphatic chain and Ar is a conventional substituted or unsubstituted aromatic substituent. Polymerizable liquid crystal compositions comprising bis(meth)acrylates as provided by various embodiments of this invention contain the two aforementioned classes of ester linkages, but also contain aryl alkanoate type linkages. The ester stretches associated with aryl arylate and alkyl alkanoate type ester linkages are reported to be coincidental, while the stretch frequency for aryl alkanoate type linkages is reported to appear at approximately 20-30 $cm^{-1}$ higher frequency (Pretsch et al, *Spectral Data for Structure Determination of Organic Compounds*, Springer-Verlag, Berlin Heidelberg, $2^{nd}$ Ed., 1989, pp. I141-I142).

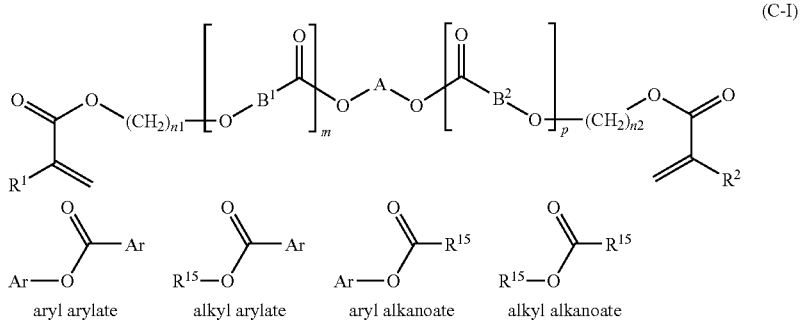
(C-I)

aryl arylate    alkyl arylate    aryl alkanoate    alkyl alkanoate

The ability of twisted nematic phases to selectively reflect light in the infrared, visible or ultraviolet region is useful in many applications. When the propagation direction of plane polarized or unpolarized light is along the helical axis of the twisted nematic layer, the wavelength of maximum reflection, $\lambda_0$, is governed by the equation $\lambda_0 = n_a p$, wherein $n_a$ is the average of $n_o$ and $n_e$, and $n_o$ and $n_e$ are defined as the ordinary and extraordinary refractive indices respectively, of the twisted nematic phase measured in the propagation direction and p is the pitch of the helix (the distance the helix takes to repeat itself). Light outside the vicinity of $\lambda_0$ is essentially unaffected in transmission. For light with a wavelength in the vicinity of wavelength $\lambda_0$, the twisted nematic phase exhibits selective reflection of the light such that approximately 50% of the light is reflected and approximately 50% of the light is transmitted, with both the reflected and transmitted beams being substantially circularly polarized. A right handed helix reflects right handed circularly polarized light and transmits left handed circularly polarized light. The bandwidth $\Delta\lambda$ of this reflected wavelength band centered about $\lambda_0$ can be determined by the formula $\Delta\lambda = \lambda_0 \cdot \Delta n/n_a$, where $\Delta n = n_e - n_o$, reflecting the birefringence present in liquid crystal materials. The pitch p can be tuned effectively by manipulating the amount of chiral dopant, the twisting power of the dopant and selection of the nematic materials. The pitch is sensitive to temperature, unwinding or tightening with a change in temperature; and to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated in the manner described in U.S. Pat. Nos. 5,506,704 and 5,793,456.

Polymer networks as provided by this invention can be made either flexible or brittle depending on crosslinking. Brittle films, for example, can be flaked and the flakes used as pigments in a variety of inks or paints for use in cosmetics and automobile paint. The films can be combined with other pigments or pigment layers, for instance black layers that act to enhance the brilliance of the reflected light.

Polymer networks as provided by this invention are useful as optical elements or components of an optical element. An optical element is any film, coating or shaped object that is used to modify the characteristics of light. The modifications produced by optical elements include changes in the intensity of light through changes in transmission or reflectivity, changes in wavelength or wavelength distribution, changes in the state of polarization, changes in the direction of propagation of part or all of the light, or changes in the spatial distribution of intensity by, for example, focusing, collimating, or diffusing the light. Examples of optical elements include linear polarizers, circular polarizers, lenses, mirrors, collimators, diffusers, reflectors and the like. One specific example of an optical element is a layer of a cholesteric network as provide by this invention that reflects light within the vicinity of $\lambda_0$, employed in a window structure.

An optical element prepared from a polymer network as provided by this invention may be used as a component in a multilayer laminate, one form of which may be a laminated article. In one embodiment, the optical element may be provided in the form of a sheet that has a thickness of greater than about 10 mils (0.25 mm), or about 20 mils (0.50 mm) or greater, where the total thickness of all components from which the laminate is composed may be a thickness of about 30 mils (0.75 mm) or greater to ensure adequate penetration resistance commonly regarded as a feature of safety laminates. Polymeric sheets useful for such purpose may be formed by any suitable process such as extrusion, calendering, solution casting or injection molding.

EXAMPLES

The advantageous attributes and effects of this invention may be more fully appreciated from a series of examples (Examples 1~4), as described below. The embodiments on which the examples are based are representative only, however, and the selection of those embodiments to illustrate the invention does not indicate that materials, conditions, specifications, components, regimes, reactants, steps, ingredients, or techniques not described in these examples are not suitable for practicing this invention, or that subject matter not described in these examples is excluded from the scope of the appended claims and equivalents thereof.

In the following examples, thermal transitions are given in degrees Centigrade. The following notations are used to describe the observed phases: K=crystal, N=nematic, S=smectic, TN*=twisted nematic, X=unidentified phase, I=isotropic, P=polymerized. The thermal transitions and phase assignments were made with differential scanning calorimetry and hotstage optical microscopy. Unless noted otherwise, the phase behavior refers to the first heating cycle.

Compounds 1 and 2 were obtained as described in US-A-2007/0228326. All other materials used in the examples were obtained from commercial sources.

Example 1

This example illustrates the formation of Mixture 1 and Mixture 2. Mixture 1 corresponds to an intermediate composition comprising one compound of Formula (I), two compounds of Formula (II), and one compound of Formula (III). Mixture 2, a liquid crystal composition of one embodiment of the invention, corresponds to a composition comprising one compound of Formula (IV), two compounds of Formula (V), and one compound of Formula (VI).

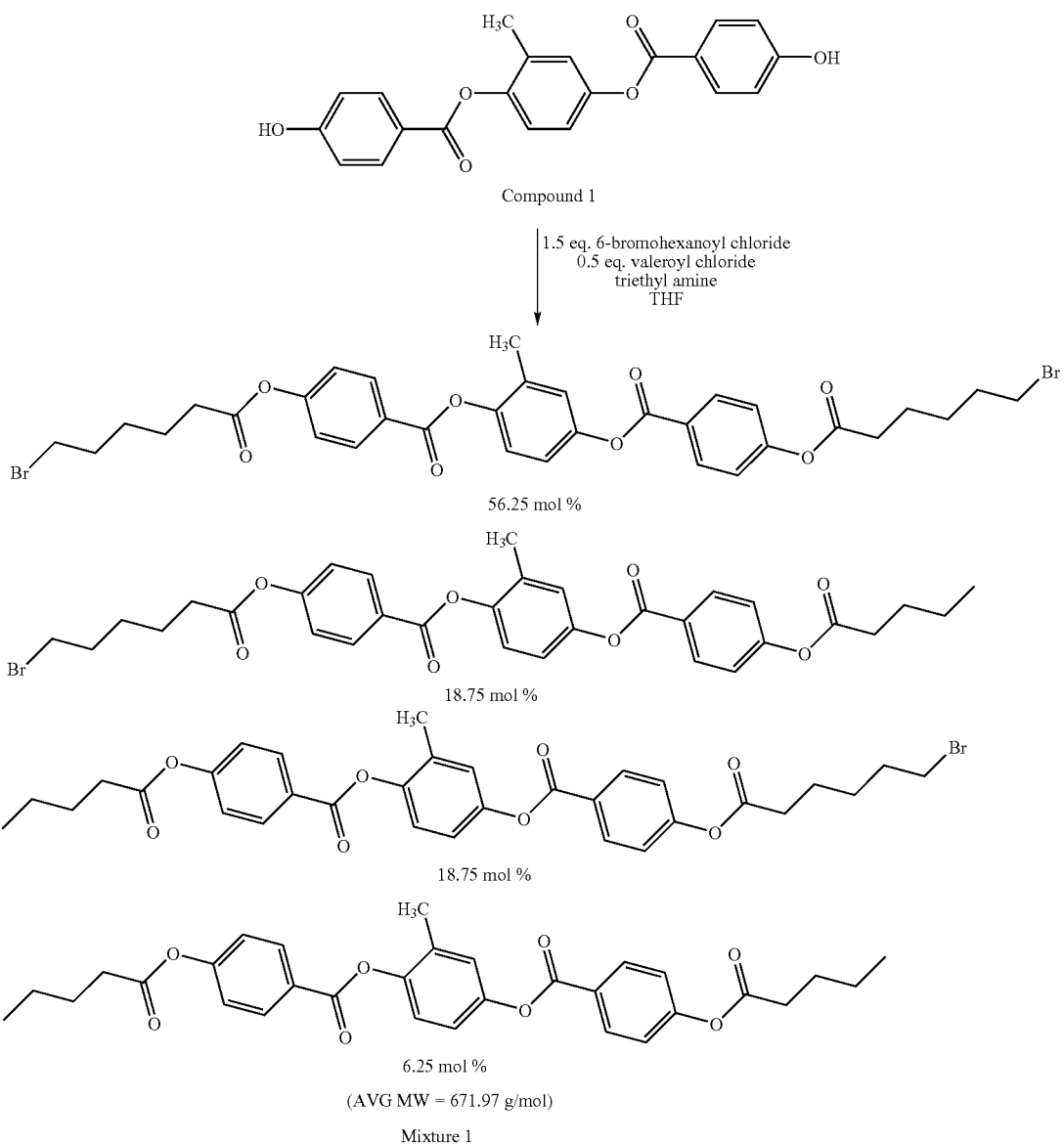

Mixture 1

10 g of Compound 1 was dissolved in 40 mL THF and 9.5 mL triethylamine and cooled to 0° C. A mixture of 8.96 g 6-bromohexanoyl chloride and 1.68 g valeroyl chloride in 60 mL THF was added dropwise over 20 minutes. Stirring was continued for another 30 minutes at 0° C. The cooling bath was removed and the reaction allowed to stir for an additional 90 minutes. The reaction was filtered to remove salts and the salts were washed with THF. Approximately 75% of the solvent was removed under reduced pressure and the crude oil was added to an excess of water, forming a colorless precipitate. The solids were filtered, washed with water, methanol, and dried to provide 17.74 g of Mixture 1. $1^{st}$ heating: K 81-85 N 177-179 I

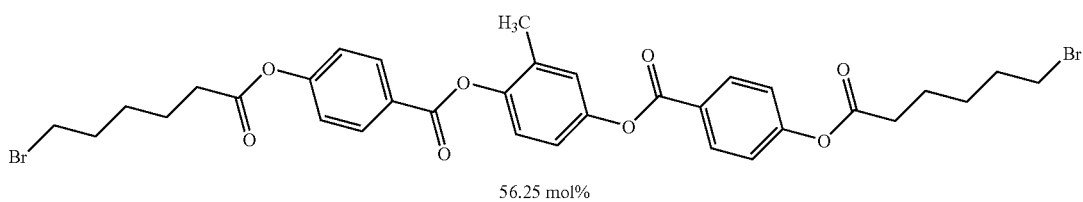

56.25 mol%

18.75 mol%
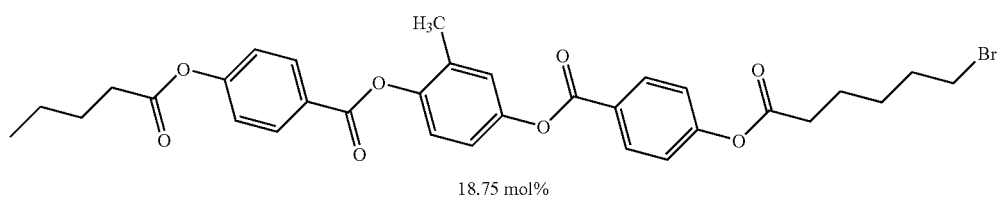
18.75 mol%
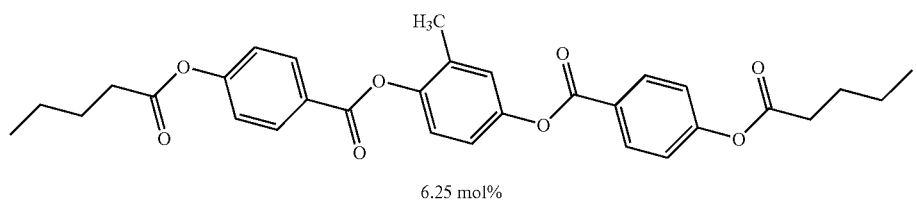
6.25 mol%
(AVG MW = 671.97 g/mol)
Mixture 1
↓ acrylic acid, TBAl, KHCO₃, THF
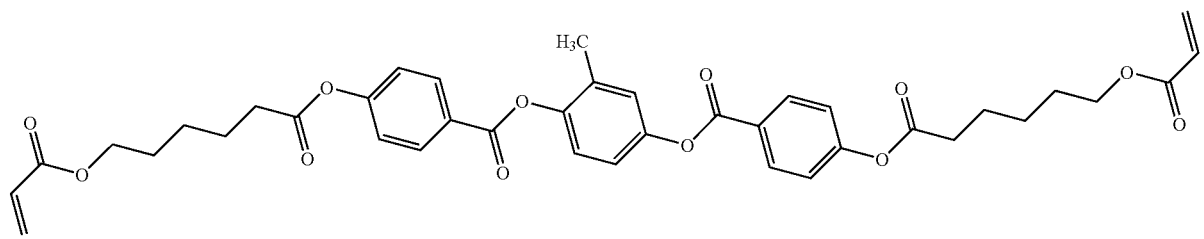
56.25 mol%
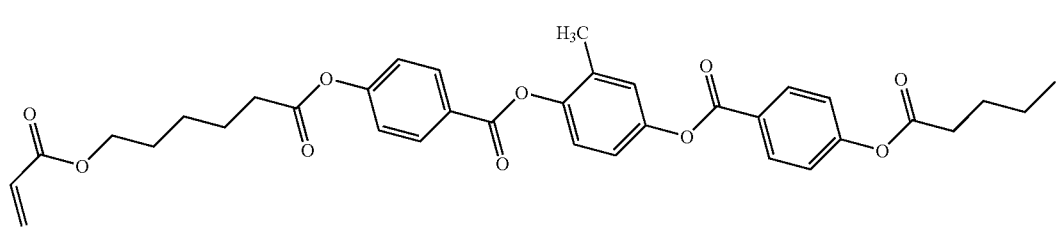
18.75 mol%

-continued

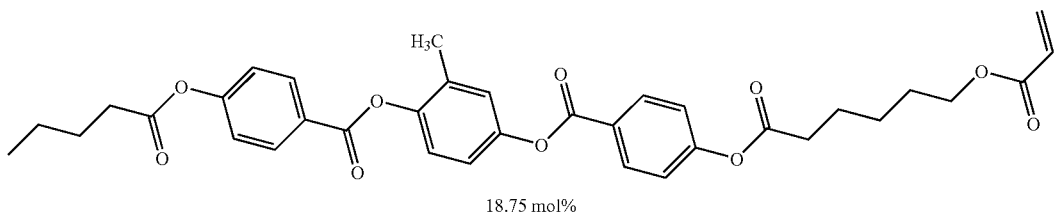

18.75 mol%

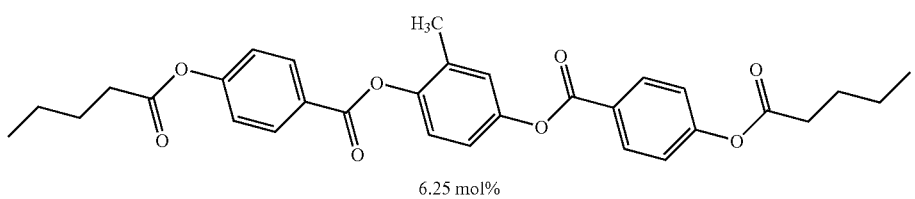

6.25 mol%

(AVG MW = 658.69 g/mol)

Mixture 2

10 g of Mixture 1, 4.96 g potassium bicarbonate, 2.2 g tetrabutylammonium iodide, 0.01 g phenothiazine, and 55 mL THF were combined. Distilled acrylic acid (2.3 mL) was added and the reaction was heated to reflux under nitrogen for 4.5 hours. The reaction was cooled to room temperature, filtered, and the solvent was removed under reduced pressure. The residue was taken up in ethyl acetate and washed with water. The organics were dried over $MgSO_4$ and concentrated to provide a yellow oil that solidified on standing, providing 9.57 g of Mixture 2. Room temperature nematic, $1^{st}$ heating: N→108-112→I; $1^{st}$ cooling: I→110-107→N.

Example 2

This example illustrates the formation of Network 1, a cross-linked polymer network of one embodiment of the invention.

Cholesteric Formulation 1 was prepared by combining 1.85 g Mixture 2, 0.110 g Compound 2, and 0.040 g Irgacure 184. The mixture was dissolved in methylene chloride and filtered through a 0.45 micron pore size syringe filter. The solvent was removed under reduced pressure and four milliliters of xylenes was added and the mixture was stirred for 10 minutes at 60° C. A polyethylene terephthalate film was hand rubbed with a Yoshikawa YA-20-R rubbing cloth. A small amount of Cholesteric Formulation 1 was coated by hand using a Wire Size 20 Wire Wound Lab Rod (Paul N. Gardner Company, Pompano Beach, Fla.). The wet coating was heated at 60° C. for 2 minutes. The film was cooled to room temperature, placed in a nitrogen atmosphere, and treated with a Blak-Ray Long Wave UV Mercury Lamp (UVP Inc., Upland, Calif.) for 2 minutes to provide Network 1.

Example 3

This example illustrates the formation of Mixture 3 and Mixture 4. Mixture 3 corresponds to an intermediate composition comprising one compound of Formula (I), four compounds of Formula (II), and four compounds of Formula (III). Mixture 4, a liquid crystal composition of one embodiment of the invention, corresponds to a composition comprising one compound of Formula (IV), four compounds of Formula (V), and four compounds of Formula (VI).

Compound 2

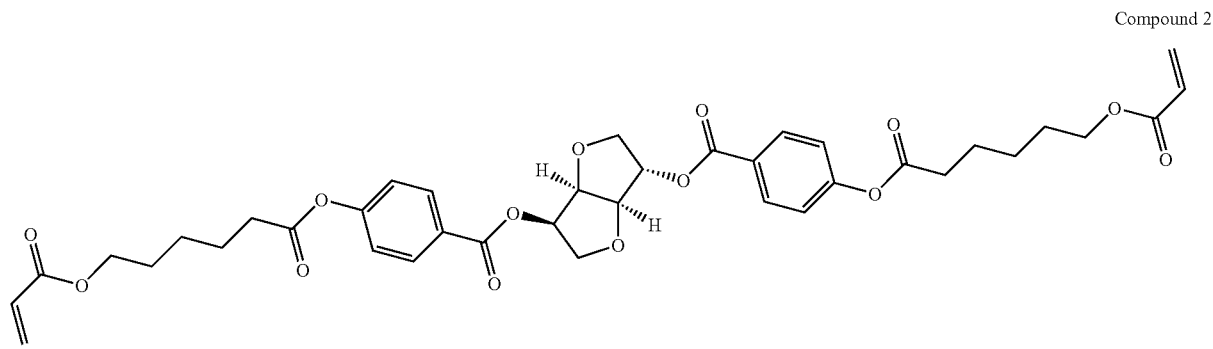

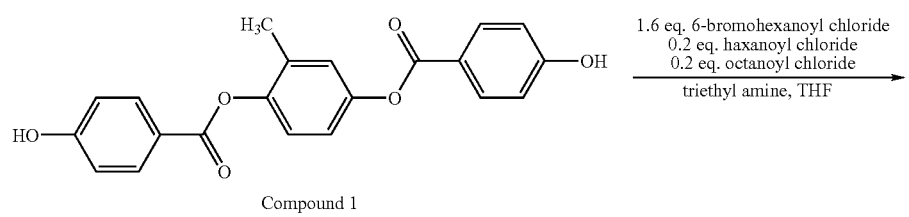
Compound 1
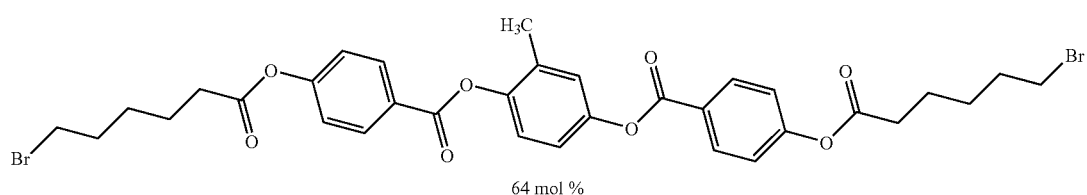
64 mol %
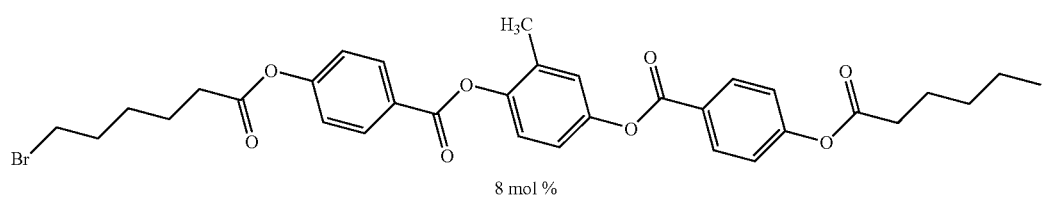
8 mol %
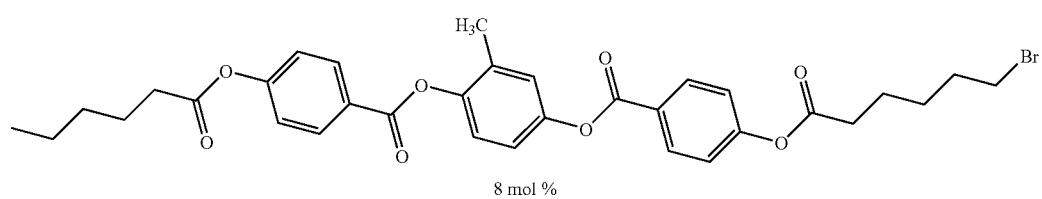
8 mol %
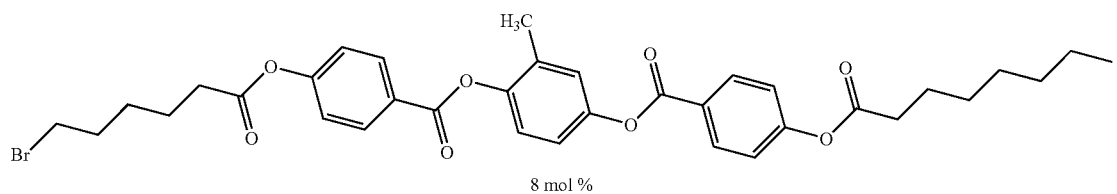
8 mol %
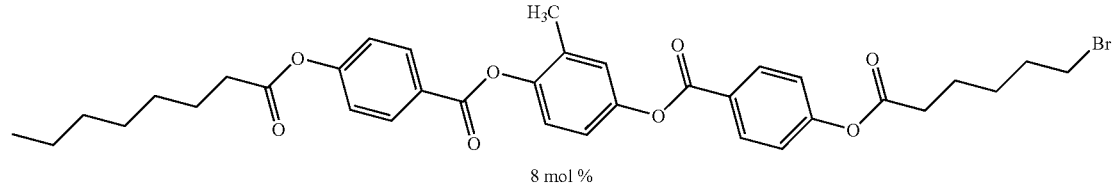
8 mol %
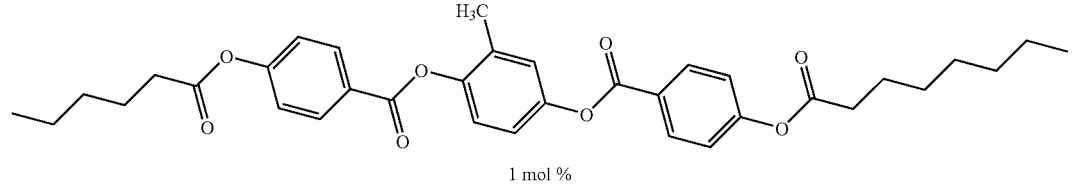
1 mol %

-continued

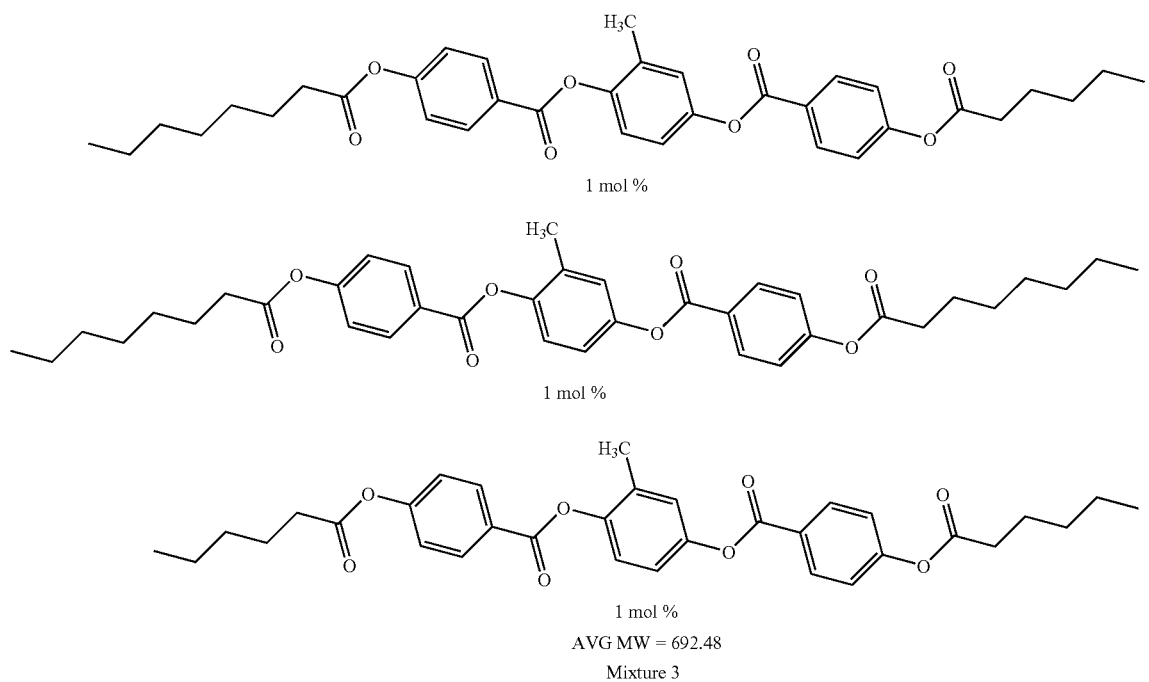

1 mol %

AVG MW = 692.48

Mixture 3

10 g of Compound 1 was dissolved in 40 mL THF and 9.5 mL triethylamine and the solution was cooled to 0° C. A mixture of 9.56 g 6-bromohexanoyl chloride, 0.75 g hexanoyl chloride, and 0.91 g octanoyl chloride in 30 mL THF was added dropwise over 20 minutes. The reaction mixture was stirred for another 30 minutes at 0° C., the cooling bath was removed and the reaction was allowed to stir for an additional 90 minutes. The reaction mixture was filtered to remove salts, the salts were rinsed with THF and the organics were diluted with diethyl ether and washed with water. The organics were dried over $MgSO_4$, filtered, and concentrated to provide 18.58 g of Mixture 3 as an off-white solid. $1^{st}$ heating: K 85-91 N 166-171 I

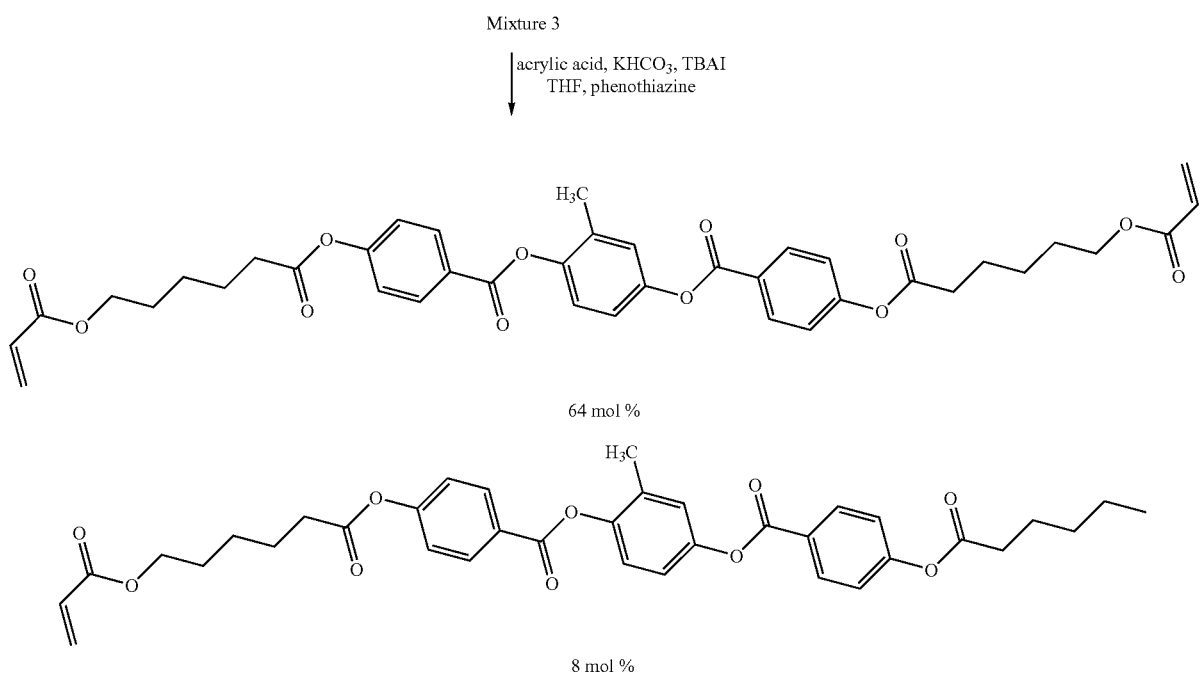

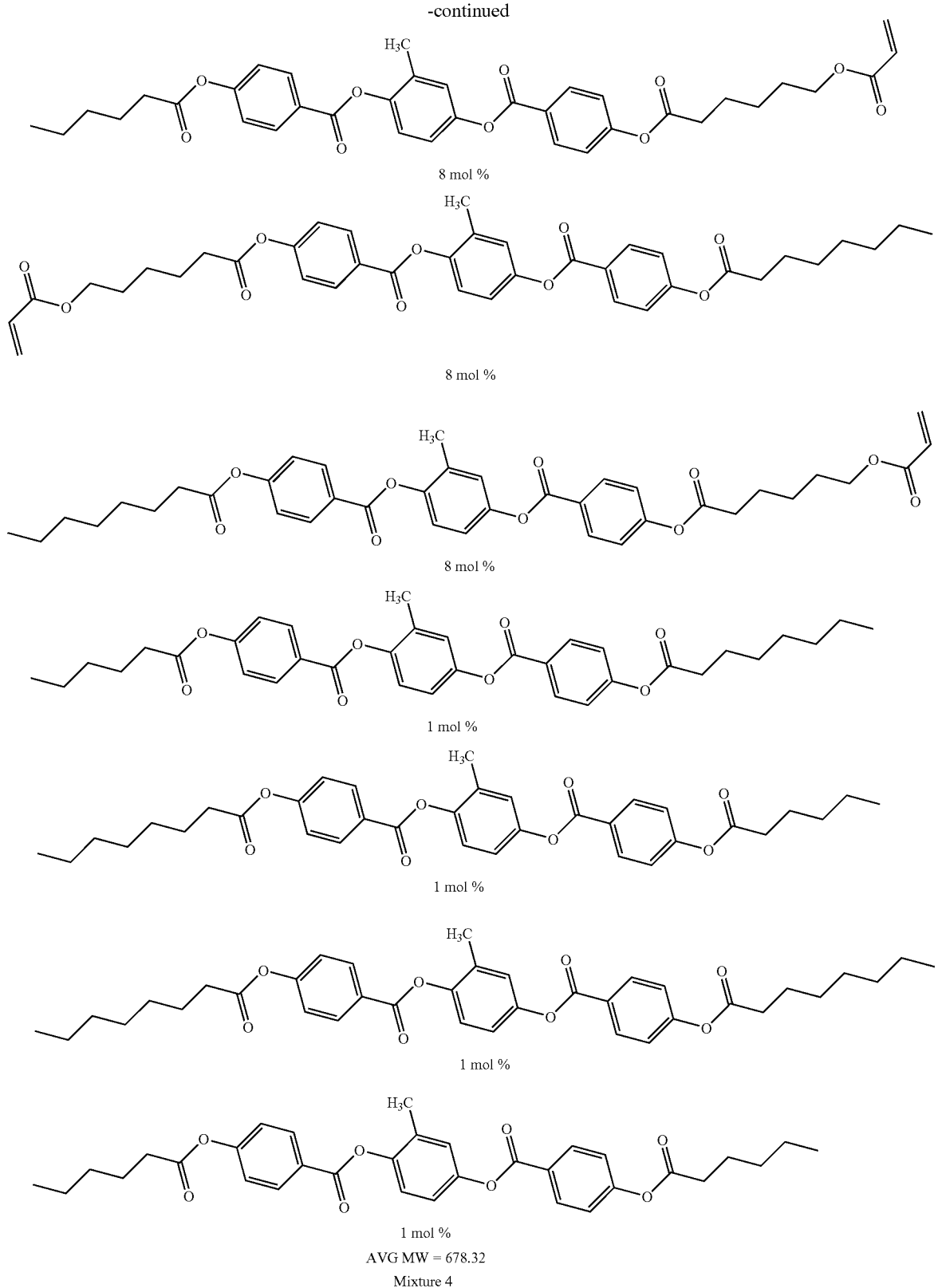
Mixture 4
To a 200 mL flask was added 10 g Mixture 3 and 55 mL THF followed by 5.4 g potassium bicarbonate, 2.1 g tetrabutylammonium iodide, and 0.002 g phenothiazine. Acrylic acid (2.48 mL) was added and the mixture was heated to reflux for 4.5 hours. The reaction was cooled and partitioned between diethyl ether and water. The organics were dried, filtered, and concentrated to an oil that solidified on standing to provide 8.82 g of Mixture 4. Room temperature nematic. First heating N→123-125→I; first cooling I→122-121→N.

Example 4

This example illustrates the formation of Mixture 5 and Mixture 6. Mixture 5 corresponds to an intermediate composition comprising four compounds of Formula (I), eight compounds of Formula (II), and four compounds of Formula (III). Mixture 6, a liquid crystal composition of one embodiment of the invention, corresponds to a composition comprising four compounds of Formula (IV), eight compounds of Formula (V), and four compounds of Formula (VI).

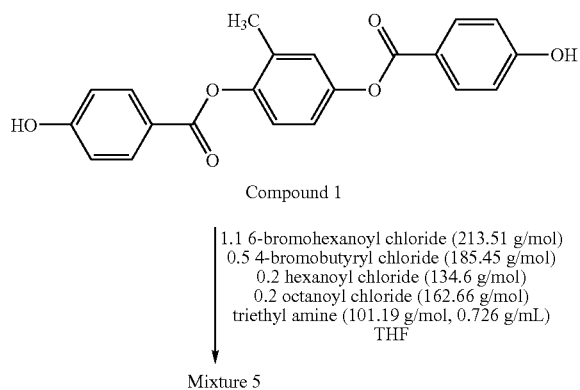

Compound 1

1.1 6-bromohexanoyl chloride (213.51 g/mol)
0.5 4-bromobutyryl chloride (185.45 g/mol)
0.2 hexanoyl chloride (134.6 g/mol)
0.2 octanoyl chloride (162.66 g/mol)
triethyl amine (101.19 g/mol, 0.726 g/mL)
THF Mixture 5

TABLE 2

Statistical Mixture of Compounds with Average Molecular Weight of 678.4535 g/mol in Mixture 5

| Isomer | Mole % | a | Z | b | Y |
|---|---|---|---|---|---|
| 1 | 30.25 | 5 | Br | 5 | Br |
| 2 | 13.75 | 5 | Br | 3 | Br |
| 3 | 5.50 | 5 | Br | 5 | H |
| 4 | 5.50 | 5 | Br | 7 | H |
| 5 | 13.75 | 3 | Br | 5 | Br |
| 6 | 6.25 | 3 | Br | 3 | Br |
| 7 | 2.50 | 3 | Br | 5 | H |
| 8 | 2.50 | 3 | Br | 7 | H |
| 9 | 5.50 | 5 | H | 5 | Br |
| 10 | 2.50 | 5 | H | 3 | Br |
| 11 | 1.00 | 5 | H | 5 | H |
| 12 | 1.00 | 5 | H | 7 | H |
| 13 | 5.50 | 7 | H | 5 | Br |
| 14 | 2.50 | 7 | H | 3 | Br |
| 15 | 1.00 | 7 | H | 5 | H |
| 16 | 1.00 | 7 | H | 7 | H |

In Table 2, "Z" and "Y" refer to the end groups of each compound in the intermediate composition Mixture 5.

Mixture 5

Mixture 5 was prepared following an analogous procedure as was described above for the preparation of Mixture 3. Mixture 5 was isolated as an off-white solid (19.16 g). The crude product was taken to the next step without purification.

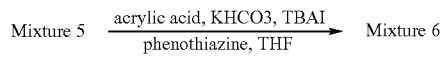

Mixture 5 was converted to Mixture 6 as was described above for the conversion of Mixture 3 to Mixture 4. Mixture 6 was isolated as an opaque oil (16.9 g). Room temperature nematic, $1^{st}$ Heating: N 126-129 I; $1^{st}$ cooling: I 125-122 N

TABLE 3

Statistical Mixture of Compounds with Average Molecular Weight of 664.29 g/mol in Mixture 6

| Isomer | Mole % | a | Q | b | W |
|---|---|---|---|---|---|
| 1 | 30.25 | 5 | —OCOCHCH2 | 5 | —OCOCHCH2 |
| 2 | 13.75 | 5 | —OCOCHCH2 | 3 | —OCOCHCH2 |
| 3 | 5.50 | 5 | —OCOCHCH2 | 5 | H |
| 4 | 5.50 | 5 | —OCOCHCH2 | 7 | H |
| 5 | 13.75 | 3 | —OCOCHCH2 | 5 | —OCOCHCH2 |
| 6 | 6.25 | 3 | —OCOCHCH2 | 3 | —OCOCHCH2 |
| 7 | 2.50 | 3 | —OCOCHCH2 | 5 | H |
| 8 | 2.50 | 3 | —OCOCHCH2 | 7 | H |
| 9 | 5.50 | 5 | H | 5 | —OCOCHCH2 |
| 10 | 2.50 | 5 | H | 3 | —OCOCHCH2 |
| 11 | 1.00 | 5 | H | 5 | H |
| 12 | 1.00 | 5 | H | 7 | H |
| 13 | 5.50 | 7 | H | 5 | —OCOCHCH2 |
| 14 | 2.50 | 7 | H | 3 | —OCOCHCH2 |
| 15 | 1.00 | 7 | H | 5 | H |
| 16 | 1.00 | 7 | H | 7 | H |

In Table 3, "Q" and "W" refer to the end groups of each compound, and "—OCOCHCH2" refers to an acrylate group.

In other particular embodiments, the inventions hereof provide compositions wherein for at least one compound of each of the Formulas (IV), (V) and (VI), m is 1 and p is 0; and wherein for at least one compound of each of the Formulas (IV), (V) and (VI), m is 1 and p is 1.

wherein n1 through n6 are each independently selected from the group consisting of 3 to 10.

wherein n1, n2, and n4 are the same.

wherein the composition comprises only one compound of Formula (IV), and wherein, optionally, n1, n2, and n4 are the same.

wherein the total amount of compounds of Formula (IV) are present in the range of about 5 mole percent to about 95 mole percent, based on the composition.

wherein the total amount of compounds of Formula (V) are present in the range of about 0.1 mole percent to about 50 mole percent, based on the composition.

wherein the total amount of compounds of Formula (VI) are present in the range of about 0.1 mole percent to about 90 mole percent, based on the composition.

wherein Formula (IV) is Formula (XXIV):

(XXIV)

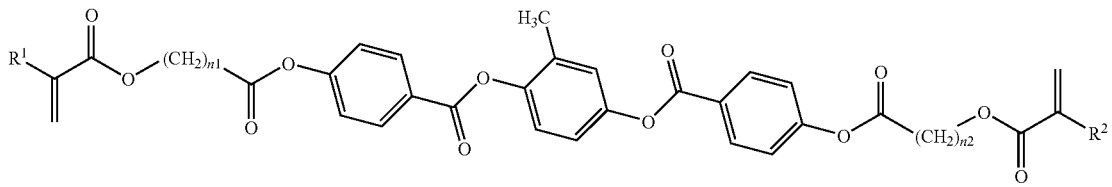

wherein a chiral compound is a cholesteryl ester or carbonate.

Each of the formulae shown herein describes each and all of the separate, individual compounds that can be formed in that formula by (i) selection from within the prescribed range for one of the variable, substituents or numerical coefficients while all of the other variable radicals, substituents or numerical coefficients are held constant, and (ii) performing in turn the same selection from within the prescribed range for each of the other variable radicals, substituents or numerical coefficients with the others being held constant. In addition to a selection made within the prescribed range for any of the variable radicals, substituents or numerical coefficients of only one of the members of the group described by the range, a plurality of compounds may be described by selecting more than one but less than all of the members of the group of radicals, substituents or numerical coefficients. When the selection made within the prescribed range for any of the variable radicals, substituents or numerical coefficients is a subgroup containing (a) only one of the members of the group described by the range, or (b) more than one but less than all of the members of the group, the selected member(s) are selected by omitting those member(s) of the whole group that are not selected to form the subgroup. The compound, or plurality of compounds, may in such event be described as containing one or more variable radicals, substituents or numerical coefficients each of which variable radicals, substituents or numerical coefficients is defined by the members of the whole group, described by the range for that variable radical, substituent or numerical coefficient in the absence of the member(s) omitted to form the subgroup.

Certain features of this invention are described herein in the context of an embodiment that combines various such features together, whether as described in the disclosure or in one of the drawings. The scope of the invention is not, however, limited by the description of only certain features within any particular embodiment, and the invention also includes (1) a subcombination of fewer than all of the features of any described embodiment, which subcombination is characterized by the absence of the features omitted to form the subcombination; (2) each of the features, individually, included within the combination of the described embodiment; and (3) other combinations of features formed from one or more or all of the features of the described embodiment together with other features as disclosed elsewhere herein.

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of this invention is stated or described as comprising, including, containing, having, being composed of or being constituted by or of certain features or elements, one or more features or elements in addition to those explicitly stated or described may be present in the embodiment. An alternative embodiment of this invention, however, may be stated or described as consisting essentially of certain features or elements, in which embodiment features or elements that would materially alter the principle of operation or the distinguishing characteristics of the embodiment are not present therein. A further alternative embodiment of this invention may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, formulations, parameters, and other quantities and characteristics recited herein, particularly when modified by the term "about", may but need not be exact, and may be approximate and/or larger or smaller than stated (as desired), reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a statement or description of the presence of an element or feature of this invention, does not limit the presence of the element or feature to one in number;

(d) the words "include", "includes" and "including" are to be read and interpreted as if they were followed by the phrase "without limitation" if in fact that is not the case; and (e) the word "or", as used herein, is inclusive; more specifically, the phrase "A or B" means "A, B, or both A and B"; and use of "or" in an exclusive sense is designated, for example, by terms such as "either A or B" and "one of A or B".

What is claimed is:
1. A process for preparing a composition comprising:
  (a) providing one or more organic polyol(s) comprising at least two hydroxyl groups and at least two covalently bonded carbon atoms, each hydroxyl group being bonded to a different carbon atom within an organic polyol;
  (b) reacting the organic polyol(s), optionally in the presence of a base, with

(i) one or more functionalized alkyl acid(s) or acid halide(s) represented by the structure of the following Formula (X):

(X)

wherein X is Cl, Br, I, or OH; Z is Br, I, —OTs, —OTf, or —OMs; and n is an integer equal to 3 to 20; and (ii) one or more non-functionalized alkyl acid(s) or acid halide(s) represented by the structures of the following Formula (XI):

(XI)

wherein X is Cl, Br, I, or OH; Y is H; and t is an integer equal to 3 to 20; in a first reaction solvent at a first reaction temperature to provide a mixture comprising an intermediate composition and a first spent reaction mixture, the intermediate composition comprising at least one compound of the group of compounds represented by the structures of each of the following Formulas (I), (II) and (III),

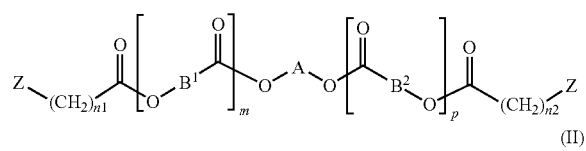
(I)

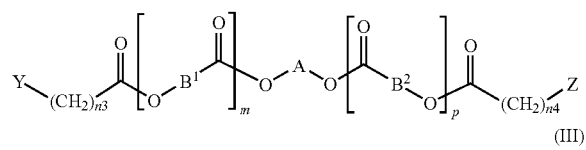
(II)

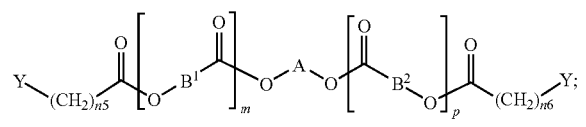
(III)

wherein
n1, n2, n3, n4, n5, and n6 are each independently integers 3 to 20;
m and p are each independently integers 0, 1, or 2;
A is a divalent radical selected from the group:

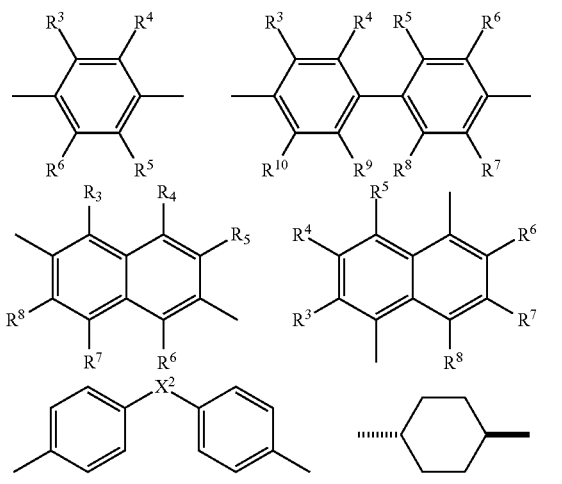

wherein $R^3$ through $R^{10}$ are each independently selected from the group: H, $C_1$ to $C_8$ straight or branched chain alkyl, $C_1$ to $C_8$ straight or branched chain alkyloxy, F, Cl, phenyl, —C(O)CH$_3$, CN, and CF$_3$; $X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl and (c) reacting the intermediate composition with a (meth) acrylate salt in the presence of a phase transfer catalyst and a second reaction solvent at a second reaction temperature to provide a product mixture comprising a composition, and a second spent reaction mixture.

2. The process of claim 1 wherein the polyol comprises a diol selected from the group of compounds represented by the structures of the following Formulas (XIIIa-XIIIg):

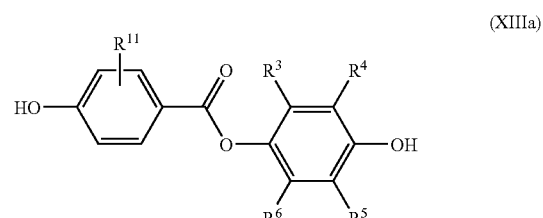
(XIIIa)

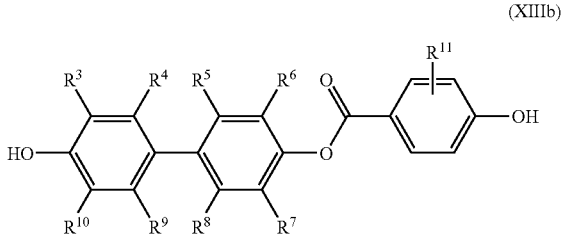
(XIIIb)

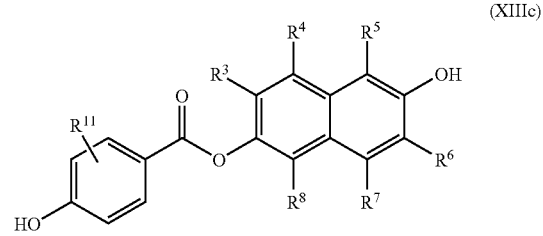
(XIIIc)

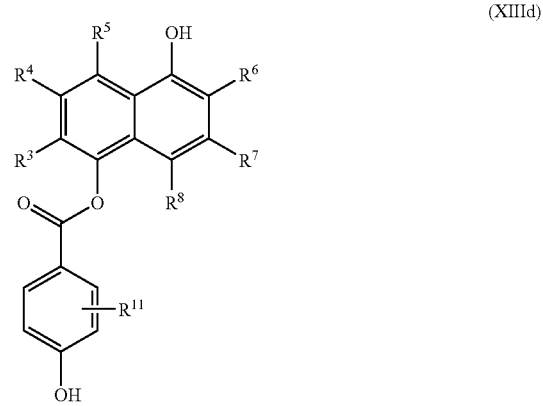
(XIIId)

(XIIIe)

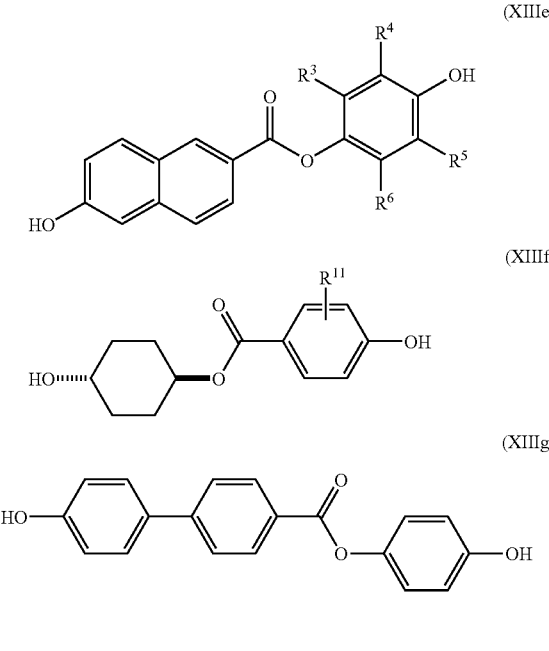

(XIIIf)

(XIIIg)

wherein $R^3$-$R^{10}$ are selected from the group: H, $C_1$-$C_8$ straight or branched chain alkyl, $C_1$-$C_8$ straight or branched chain alkyloxy, F, Cl, phenyl, —C(O)CH$_3$, CN and CF$_3$; and $R^{11}$ is H, —CH$_3$ or —OCH$_3$.

3. The process of claim 1 wherein the polyol comprises a diester diol selected from the group of materials represented by the structures of the following Formulas (XIVa-XIVf):

(XIVa)

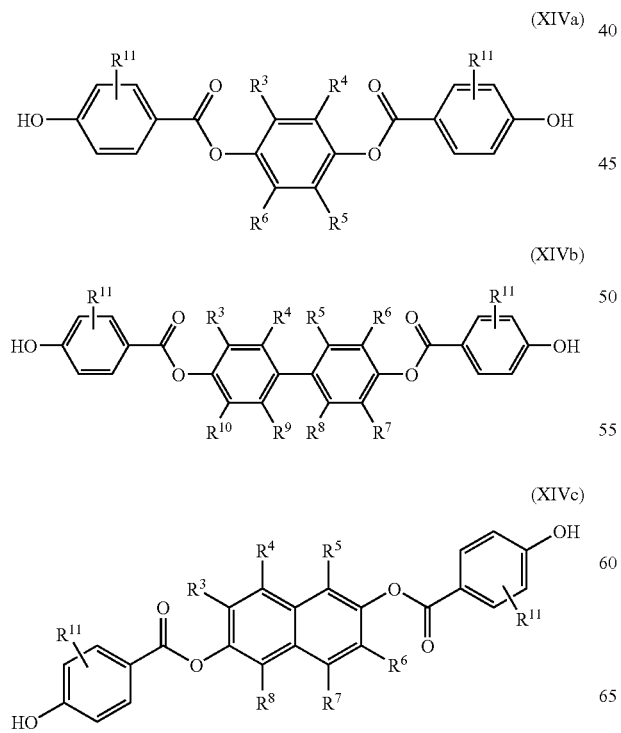

(XIVb)

(XIVc)

(XIVd)

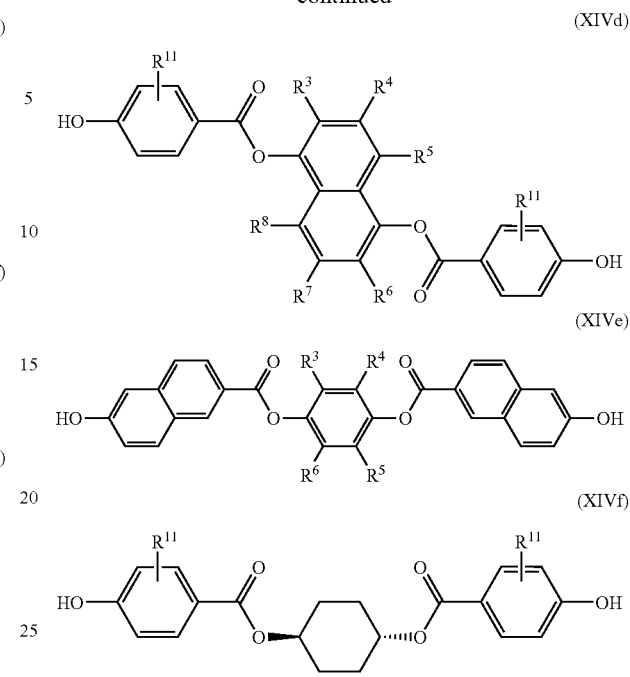

(XIVe)

(XIVf)

wherein $R^3$-$R^{10}$ are selected from the group: H, $C_1$-$C_8$ straight or branched chain alkyl, $C_1$-$C_8$ straight or branched chain alkyloxy, F, Cl, phenyl, —C(O)CH$_3$, CN and CF$_3$; and $R^{11}$ is H, —CH$_3$ or —OCH$_3$.

4. The process of claim 1 wherein the second reaction solvent comprises the first spent reaction mixture.

5. The process of claim 1 which further comprises providing one or more radical inhibitors to the reaction mixture containing the intermediate composition.

6. The process of claim 1 wherein the polyol(s) are selected from the group of compounds represented by the structures of the following Formulas (XIIa-XIIf):

(XIIa)

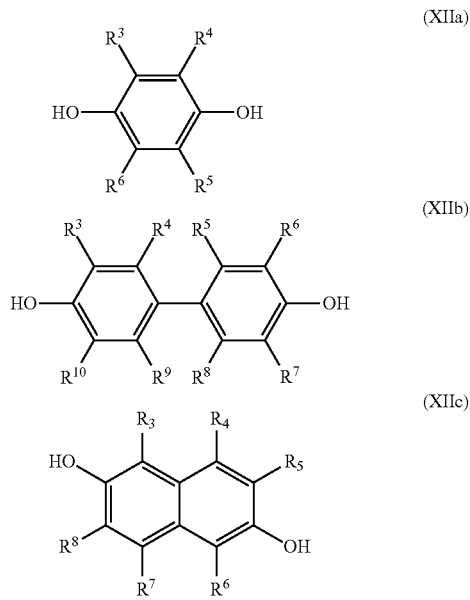

(XIIb)

(XIIc)

-continued

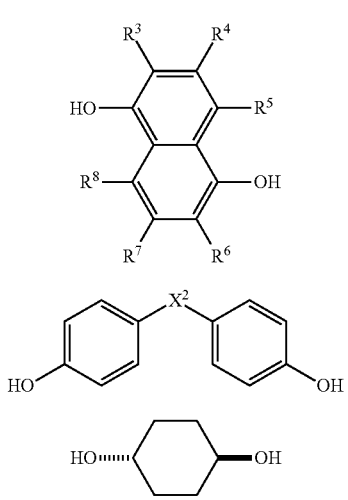

wherein $R^3$-$R^{10}$ and $X^2$ are as set forth in claim 1.

7. The process of claim 1 wherein the organic polyol comprises a diol, and the total amount of the functionalized alkyl acid halide(s) and the non-functionalized alkyl acid halide(s) is about 1.8 to about 2.5 equivalents, based on the amount of the diol.

8. The process of claim 1 wherein there is prepared in the product mixture of the composition about 0.1 mole percent to about 95 mole percent of the compound of Formula IV, based on the content of the total composition; wherein Formula IV is as follows:

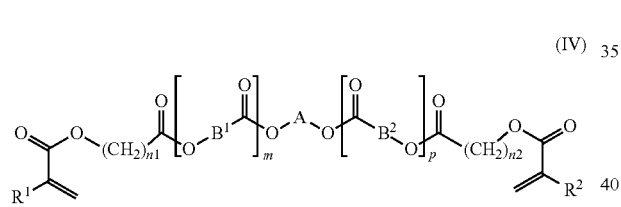

and wherein n1, n2, n3, n4, n5, n6, m, p, A, $R^3$ through $R^{10}$, $X^2$, and $B^1$ and $B^2$ are as set forth in claim 1.

9. The process of claim 8 wherein there is prepared in the product mixture of the composition about 20 mole percent to about 80 mole percent of the compound of Formula IV, based on the content of the total composition.

10. The process of claim 1 wherein there is prepared in the product mixture of the composition about 5 mole percent to about 50 mole percent of the compound of Formula V, based on the content of the total composition; wherein Formula V is as follows:

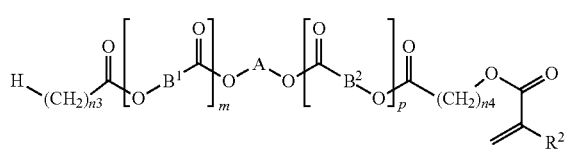

and wherein n1, n2, n3, n4, n5, n6, m, p, A, $R^3$ through $R^{10}$, $X^2$, and $B^1$ and $B^2$ are as set forth in claim 1.

11. The process of claim 1 wherein there is prepared in the product mixture of the composition about 0.1 mole percent to about 90 mole percent of the compound of Formula VI, based on the content of the total composition; wherein Formula VI is as follows:

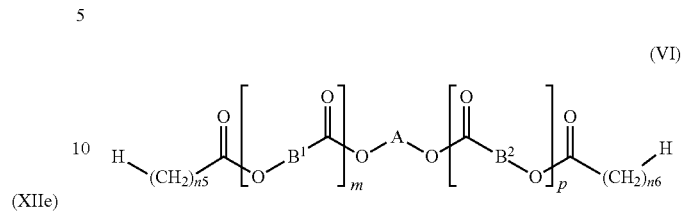

and wherein n1, n2, n3, n4, n5, n6, m, p, A, $R^3$ through $R^{10}$, $X^2$, and $B^1$ and $B^2$ are as set forth in claim 1.

12. The process of claim 11 wherein there is prepared in the product mixture of the composition about 0.1 mole percent to about 60 mole percent of the compound of Formula VI, based on the content of the total composition.

13. The process of claim 1 wherein a phase transfer catalyst is selected from the group consisting of quaternary ammonium salts and quaternary phosphonium salts.

14. The process of claim 2 wherein a polyol is reacted with one or more (meth)acrylate halides as represented by the structures of Formulae (XVa~XVc), wherein X is Cl or Br, n1 is an integer of 3 to 20, R1 is H, F, Cl or CH3, and R11 is H, —CH3 or —OCH3:

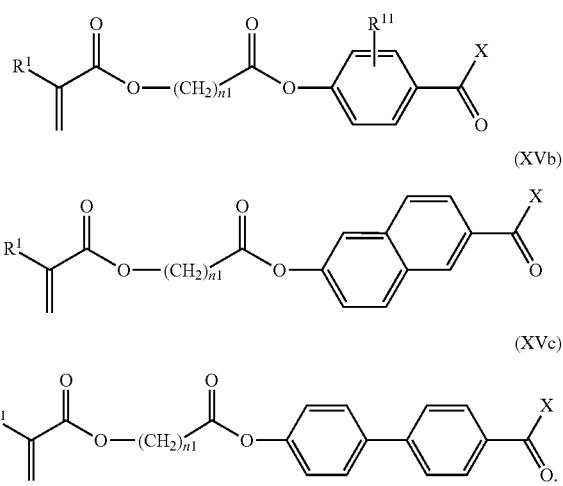

15. The process of claim 3 wherein a polyol is reacted with one or more (meth)acrylate halides as represented by the structures of Formulae (XVa~XVc), wherein X is Cl or Br, n1 is an integer of 3 to 20, R1 is H, F, Cl or CH3, and R11 is H, —CH3 or —OCH3:

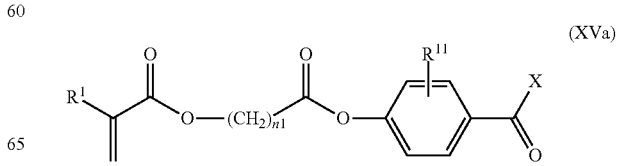

-continued
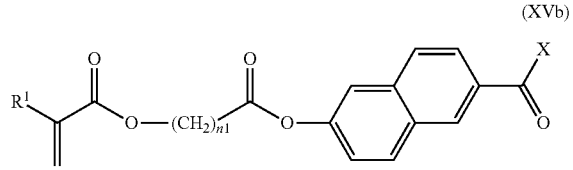
(XVb)
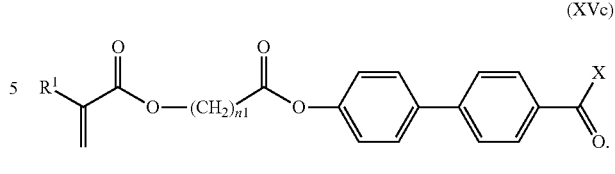
(XVc)
* * * * *